United States Patent
Kenmochi et al.

(10) Patent No.: US 6,388,770 B1
(45) Date of Patent: *May 14, 2002

(54) DATA COMMUNICATION APPARATUS AND FACSIMILE APPARATUS

(75) Inventors: Toshio Kenmochi, Yokohama; Sadasuke Kurahayashi, Niiza; Takehiro Yoshida, Tokyo; Naoji Hayakawa, Machida; Toru Maeda, Mitaka; Shigeki Ohno, Machida; Yoshio Yoshiura, Kanagawa-ken; Kazutaka Matsueda, Yokohama; Motoaki Yoshino, Fujisawa; Fumiyuki Takiguchi, Yokohama; Kazuto Yanagisawa, Toride; Hideki Shimizu, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/545,114

(22) Filed: Oct. 19, 1995

(30) Foreign Application Priority Data

Oct. 21, 1994 (JP) ............................................. 6-282651
Dec. 5, 1994 (JP) ............................................. 6-300940

(51) Int. Cl.$^7$ ................................................. H04N 1/36
(52) U.S. Cl. ................... 358/412; 379/100.06; 358/434
(58) Field of Search ........................ 358/400, 405–407, 358/409, 412, 434–436, 438, 439, 442, 443; 379/100.01, 100.06, 100.09, 100.13, 100.14, 100.17, 93.33; 370/276, 278, 282

(56) References Cited

U.S. PATENT DOCUMENTS

| 4,729,033 A | 3/1988 | Yoshida ....................... 358/435 |
| 5,172,246 A | 12/1992 | Yoshida ....................... 358/406 |
| 5,343,515 A | * 8/1994 | Treffkorn ................. 379/93.33 |

FOREIGN PATENT DOCUMENTS

| EP | 0198396 | 10/1986 | .......... H04M/11/06 |
| EP | 0505860 | 9/1992 | ............ H04M/1/42 |
| GB | 2169174 | 7/1986 | ........... H04L/27/06 |

* cited by examiner

Primary Examiner—Jerome Grant, II
(74) Attorney, Agent, or Firm—Fitzpatrick, Cella, Harper & Scinto

(57) ABSTRACT

A facsimile communication system and a communication apparatus reduce a loss time due to the synchronization of transmission/reception and shorten a communication time. They also shorten a communication time in a full duplex communication mode and allow proper switching of the full duplex communication at the transmission/reception replacement. DIS-CFR signals, EOP-DCN signals, NSS-TSI signals and TSI-DCS signals of a facsimile communication protocol are connected by synchronization signals so that the synchronization signals are sent even after the sending of the protocol signal. Thus, the sending of the synchronization signal for one second when the next protocol signal is sent is not necessary and a time required for the protocol signal is shortened. An ANSam signal to disable a function of an echo suppressor is sent when a call is detected and a calling station thereafter sends a protocol signal and an image signal in a manner not to cause signal interruption of 50 ms or longer, and at transmission/reception replacement at the end of the image signal from the calling station, a called station sends an ANSam signal and sends a protocol signal.

19 Claims, 25 Drawing Sheets

FIG. 17A
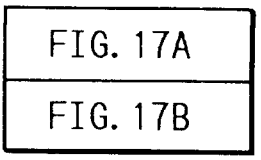
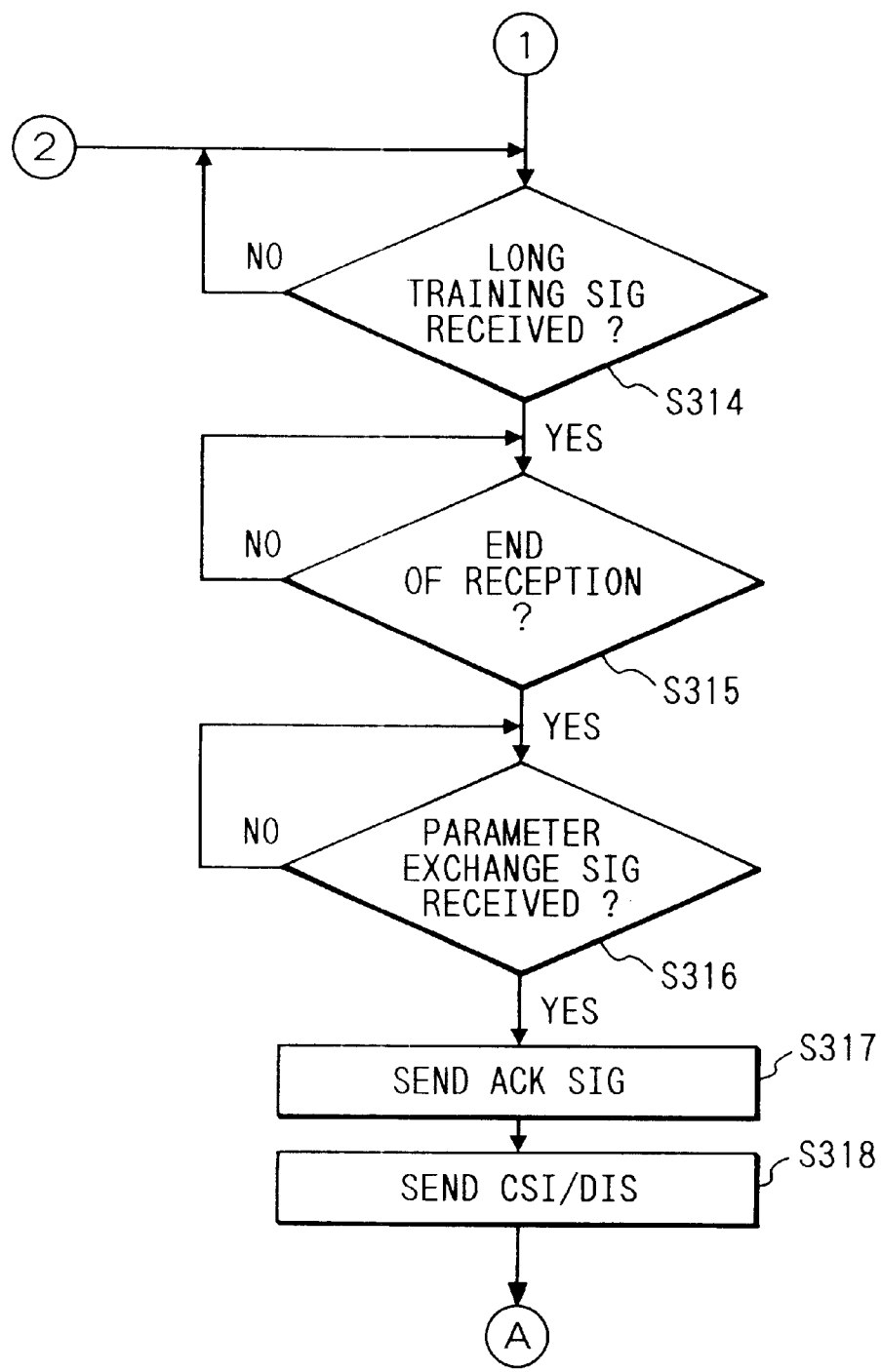

| FIG. 20A |
| FIG. 20B |
| FIG. 20C |

DATA COMMUNICATION APPARATUS AND FACSIMILE APPARATUS

BACKGROUND OF THE INVENTION

1. Field of the Invention

The present invention relates to a facsimile communication system and a communication apparatus.

The present invention also relates to a data communication apparatus having ability of data communication by a full duplex communication mode.

2. Related Background Art

In a prior art facsimile communication system of this type, a communication system by a half duplex communication mode defined by T.30 of the ITU-T T-series Recommendation as shown in FIG. 9 has been commonly adapted.

However, in the prior art system, in the communication of a communication protocol of other than image information by V.21, a synchronization signal of approximately one second is added in front of data in each protocol signal in order to synchronize the data reception at both sending and receiving stations. Thus, in order to send data of 0.1 second length, for example, a signal of 1.1 second must be sent and an extra communication time is needed by the synchronization signal.

A facsimile apparatus has been known as an apparatus of this type. When full duplex communication is to be conducted through a public line, it is necessary to disable a function of an echo suppressor (or echo canceler) provided in a public network. The function of the echo suppressor in the public network is disabled by sending a signal of 2100 Hz of a predetermined duration (500 msec to 1 sec) to the line and enabled by the interruption of the signal on the line for 100 msec or longer.

In a prior art full duplex communication facsimile apparatus, a protocol signal is communicated in the half duplex mode and an image signal is communicated in the full duplex mode. Since the interruption of signal for 100 msec or longer may occur in the communication of the protocol signal in the half duplex mode, a signal of 2100 Hz is sent for a predetermined time interval in order to disable the echo suppressor immediately before each communication of the image signal and then the image signal is communicated in the full duplex mode.

However, the signal of 2100 Hz to disable the echo suppressor need be sent for 500 msec to 1 sec. When the signal of 2100 Hz is sent for each communication of one page of image signal, the communication time is increased by the signal of 2100 Hz if a plurality of page of image signals are sent.

As the modem technology is advanced in recent years, the transmission speed has been increased. However, when the disable (disenable) signal for the echo suppressor is sent for each communication of one page of image signal, the decrease of the communication time is not efficiently attained.

SUMMARY OF THE INVENTION

It is an object of the present invention to provide a data communication apparatus which can shorten the communication time.

It is another object of the present invention to provide a facsimile communication system and a communication apparatus which can reduce a loss time due to the synchronization of both sending and receiving stations and shorten the communication time.

DETAILED DESCRIPTION OF THE PREFERRED EMBODIMENTS

Figure 1:
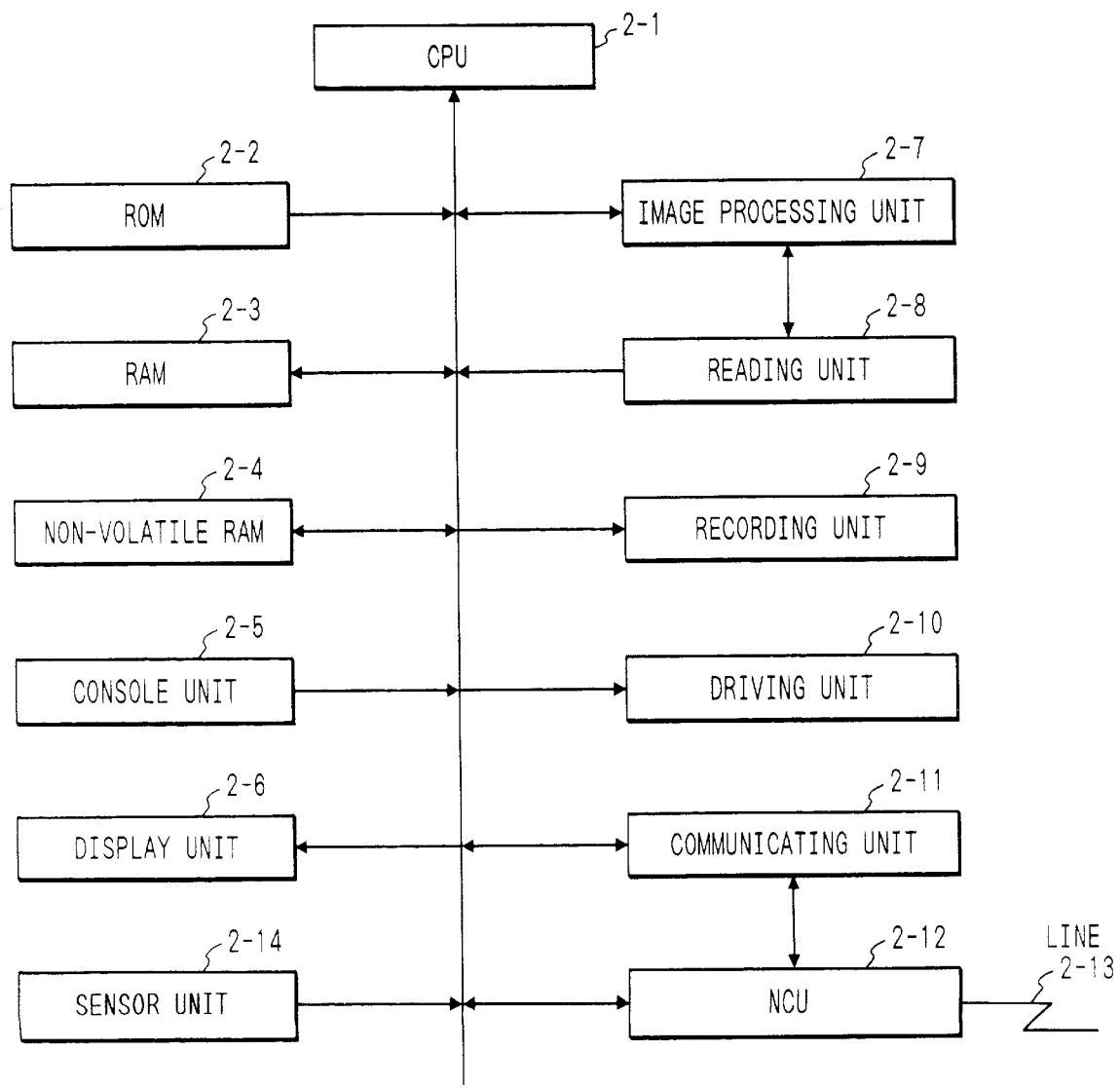
FIG. 1 shows a block diagram of one embodiment of the present invention.

FIG. 1 shows a block diagram of a configuration of a communication apparatus in accordance with a first embodiment of the present invention.

A CPU 2-1 controls an entire communication apparatus, that is, a RAM 2-3, a non-volatile RAM 2-4, a console unit (operation unit) 2-5, a display unit 2-6, an image processing unit 2-7, a read unit 2-8, a record unit 2-9, a drive unit 2-10, a communication unit 2-11, an NCU 2-12, a microphone/speaker(not shown) etc., in accordance with a program stored in a ROM 2-2.

The RAM 2-3 stores binary image data read by the read unit 2-8 or binary data to be recorded in the record unit 2-9.

The binary image data stored in the RAM 2-3 is modulated by the communication unit 2-11 and the modulated signal is outputted from a subscriber line 2-13 through the NCU 2-12. An analog waveform inputted from the subscriber line 2-13 through the NCU 2-12 is demodulated by the communication unit 2-11 and the demodulated binary data is also stored in the RAM 2-3.

The non-volatile RAM 2-4 is a battery backed-up SRAM and stores therein a telephone number inherent to a device, user abbreviation data, a communication result, a hold sound, OGM (out-going message) data, etc.

The console unit 2-5 comprises a start key for transmission and reception, a mode key for designating an operation mode such as fine/standard of a transmitted image, a copy key for reproduction, a stop key to stop the operation, a ten-key for dial calling and various settings, an off-hook key used at calling, a hold key for sending a hold sound to a line, a record key for recording a voice response message and function keys for other special functions.

The CPU 2-1 detects the depression of the keys to control the respective units in accordance with the state thereof.

The display unit 2-6 comprises a dot matrix type LCD and an LCD driver and displays an image under the control of the CPU 2-1.

The read unit 2-8 comprises a DMA controller, a CCD or a contact type image sensor (CS), a general purpose IC and a binarization circuit. It binarizes the data read by using the CCD or the CS under the control of the CPU 2-1 and sequentially sends the binary data to the RAM 2-3.

It also may transfer the read image data to the image memory through the image processing unit 2-7 as the process data therefor.

The record unit 2-9 comprises a DMA controller, a B4/A4 size thermal head or a bubble jet printer head and a general purpose IC. It reads out the record data stored in the RAM 2-3 under the control of the CPU 2-1 and print it out as a hard copy.

The drive unit 2-10 comprises stepping motors for driving sheet feed/eject rollers of the read unit 2-8 and the record unit 2-9, gears for transmitting the drive forces of the motors and driver circuits for controlling the motors.

The communication unit 2-11 mainly comprises a modem which comprises a V.34, V.32, V.32bis, V.17, V.29, V.27ter, V.23 or V.21 (both H and L channels) modem, a voice coding/compaction-decompaction function (a compaction scheme such as PCM, ADPCM or VSELP), a clock generator connected to the modem, a gain control operational amplifier and a hold sound send circuit. It modulates transmission data stored in the RAM 2-3 or voice data and hold sound data stored in the RAM 2-4 to an analog signal under the control of the CPU 2-1 and outputs it to the subscriber line 2-13 through the NCU 2-12.

The communication unit 2-11 inputs the analog signal from the subscriber line 2-13 through the NCU 2-12, demodulates it into binary data and stores it in the RAM 2-3.

The NCU 2-12 comprises a DC capture circuit, an AC capture circuit, a CI detection circuit, a two-wire/four-wire conversion circuit and a function to call a telephone number by a dial pulse or a DTMF tone under the control of the CPU 2-1. It connects the subscriber line 2-13 to the communication unit 2-11.

LINE 2-13 is the subscriber line connected to the NCU 2-12.

The sensor unit 2-14 comprises a record sheet width sensor, a record sheet presence/absence sensor, a document sheet width sensor and a document sheet presence/absence sensor. It detects the status of the document sheet and the record sheet under the control of the CPU 2-1.

Figure 2:
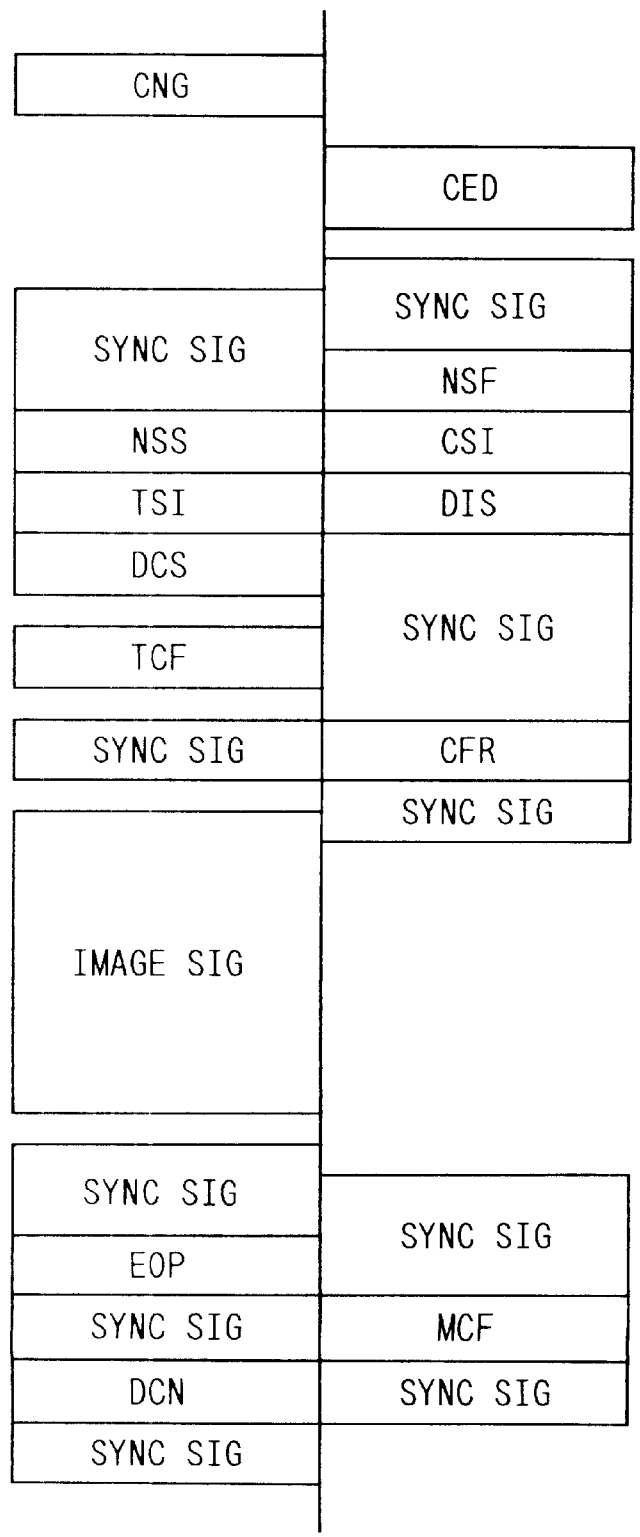
FIG. 2 illustrates a communication protocol in the first embodiment of the present invention.

FIG. 2 illustrates a communication protocol in the first embodiment of the present invention. Referring to FIG. 2, operations in the sending station and the receiving station are explained.

The operation in the sending station is first explained.

The sending station monitors the reception of a CED signal and a synchronization signal from the receiving station while it sends a CNG signal, and when it receives any one of the signals, it stops to send the CNG signal. If the detected signal is the synchronization signal, it starts to send a synchronization signal.

It receives NSF/CSI/DIS signals defined by the ITU-T T.30 Recommendation while it sends the synchronization signal, and when it receives the NSF signal, it sends an NSS signal, and when it receives the CSI signal, it sends a TSI signal, and when it receives the DIS signal, it sends a DCS signal. If it has not received the CSI signal or the DIS signal after the sending of the NSS signal, it continues to monitor the reception of those signals while it resends the synchronization signal.

After the sending of the DCS signal followed by a non-signal state of 50 ms, it sends a TCF signal which is a high rate signal. After the sending of the TCF signal followed by the non-signal state of 50 ms, it starts to send the synchronization signal, and when it receives a CFR signal from the receiving station, it stops to send the synchronization signal.

After the stop of sending the synchronization signal followed by the non-signal state of 50 ms, it reads an image signal which is a high rate signal and after the completion of the sending of the image signal followed by the non-signal state of 50 ms, it sends the synchronization signal, and after the sending of the synchronization signal for one second, it sends an EOP signal.

After the sending of the EOP signal, it starts to send the synchronization signal, and when it receives an MCF signal from the receiving station, it stops to send the synchronization signal and sends a DCN signal to release the line.

The operation at the receiving station is now explained.

When the receiving station detects a call, it sends a CED signal to indicate to the sending station that the receiving station is in an automatic response mode, and after the non-signal state of 50 ms, it monitors the reception of a synchronization signal while it sends a synchronization signal.

After the sending of the synchronization signal for one second, if it receives the synchronization signal from the sending station, it sends NSF/CSI/DIS signals. After the sending of the DIS signal, it starts to send the synchronization signal and monitors the reception of the high rate signal.

When it receives the TCF signal from the sending station, it stops to send the synchronization signal and sends the CFR signal. After the sending of the CFR signal, it sends the synchronization signal and when it receives the image signal which is the high rate signal from the sending station, it stops to send the synchronization signal.

When it detects the end of the image signal, it monitors the reception of the synchronization signal and when it receives the synchronization signal, it sends the synchronization signal.

When it receives the EOP signal, it stops to send the synchronization signal and sends the MCF signal, and after the sending, it sends the synchronization signal. When it receives the DCN signal, it stops to send the synchronization signal and releases the line.

Figure 3:
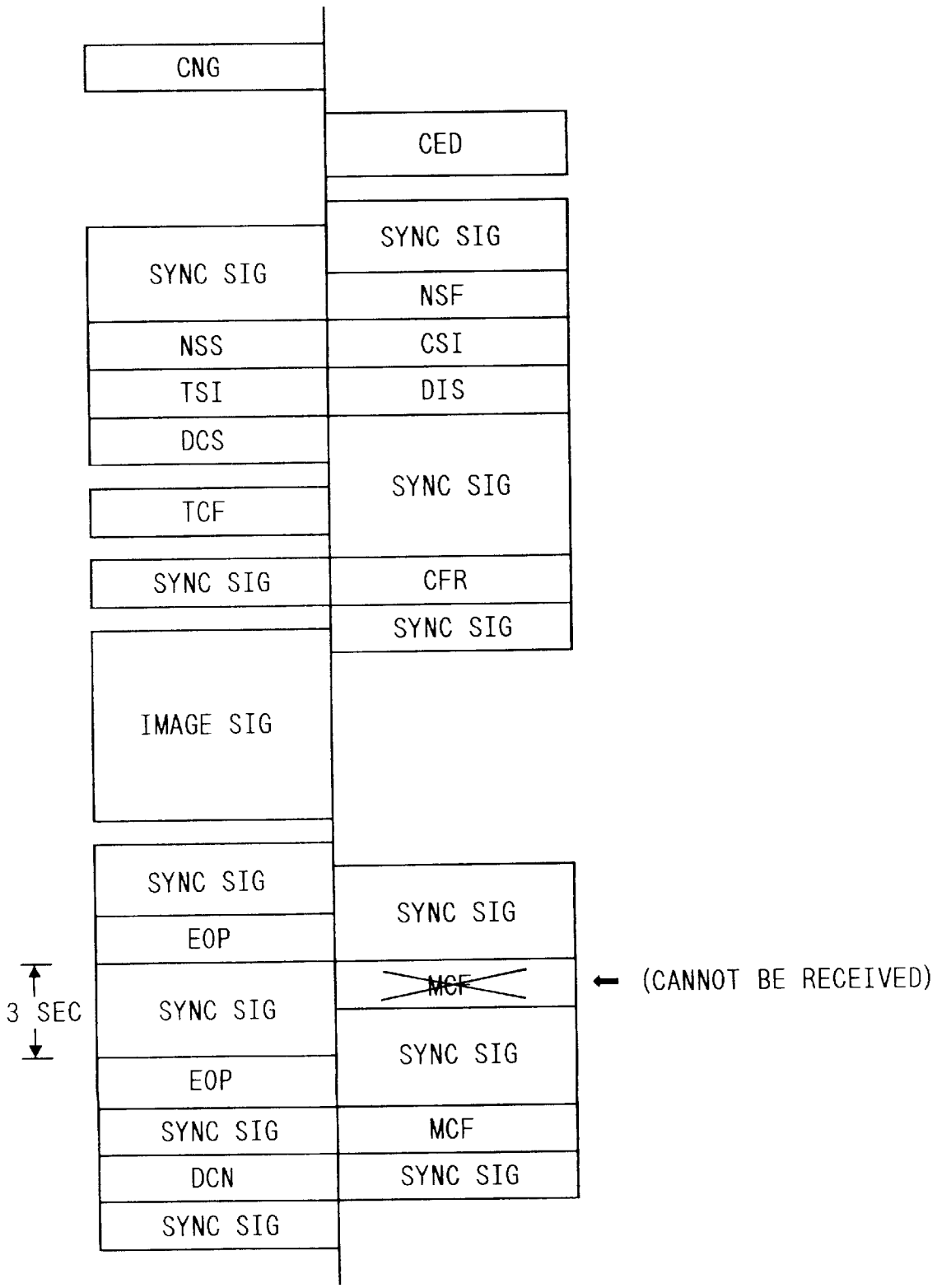
FIG. 3 illustrates a communication protocol in a reception error in the first embodiment.

In the above communication protocol, an operation when a reception error occurs is explained for the sending station and the receiving station in sequence. FIG. 3 illustrates a communication protocol therefor.

First, the sending station monitors the reception of the CED signal and the synchronization signal from the receiving station while it sends the CNG signal, and when it receives one of the signals, it stops to sends the CNG signal and if the detected signal is the synchronization signal, it starts to send the synchronization signal.

It receives the NSF/CSI/DIS signals defined by the ITU-T T.30 Recommendation while it sends the synchronization signal, and when it receives the NSF signal, it sends the NSS signal, and when it receives the CSI signal, it sends the TSI signal, and when it receives the DIS signal, it sends the DCS signal. If it has not received the CSI signal or the DIS signal after the sending of the NSS signal, it continues to monitor the reception of those signals while it resends the synchronization signal.

After the sending of the DCS signal followed by the non-signal state of 50 ms, it sends the TCF signal which is a high rate signal. After the sending of the TCF signal followed by the non-signal state of 50 ms, it starts to send the synchronization signal and when it receives the CFR signal from the receiving station, it stops to send the synchronization signal.

After the stopping of the sending of the synchronization signal followed by the non-signal state of 50 ms, it sends the image signal which is a high rate signal and after the sending of the image signal followed by the non-signal state of 50 ms, it sends the synchronization signal, and after the sending of the synchronization signal for one second, it sends to EOP signal.

After the sending of the EOP signal, it starts to send the synchronization signal, and if there is no response from the receiving station, it resends the EOP signal three seconds later.

When it receives the MCF signal from the receiving station, it stops to send the synchronization signal and sends the DCN signal to release the line.

On the other hand, when the receiving station receives a call, it sends the CED signal to indicate to the sending station that the receiving station is in the automatic response mode, and after the non-signal state of 50 ms, it monitors the reception of the synchronization signal while it sends the synchronization signal.

After the sending of the synchronization signal for one second, if it receives the synchronization signal from the sending station, it sends the NSF/CSI/DIS signals. After the sending of the DIS signal, it starts to send the synchronization signal and starts to monitor the reception of the high rate signal.

Thereafter, when it receives the TCF signal from the sending station, it stops to send the synchronization signal and sends the CFR signal. After the sending of the CFR signal, it sends the synchronization signal and when it receives the image signal which is the high rate signal from the sending station, it stops to send the synchronization signal.

When it detects the end of the image signal, it monitors the reception of the next image signal, and when it receives the synchronization signal, it sends the synchronization signal. Thereafter, when it receives the EOP signal, it stops to send the synchronization signal and sends the MCF signal, and after the sending of the MCF signal, it sends the synchronization signal.

If the sending station does not receive the MCF signal, the EOP signal is resent three seconds later and when it receives the resent EOP signal, the receiving station resends the MCF signal, and if it receives the DCN signal, it stops to send the synchronization signal and releases the line.

Referring to flow charts of FIGS. 4 to 8, the operation of the first embodiment is explained.

Figure 4:
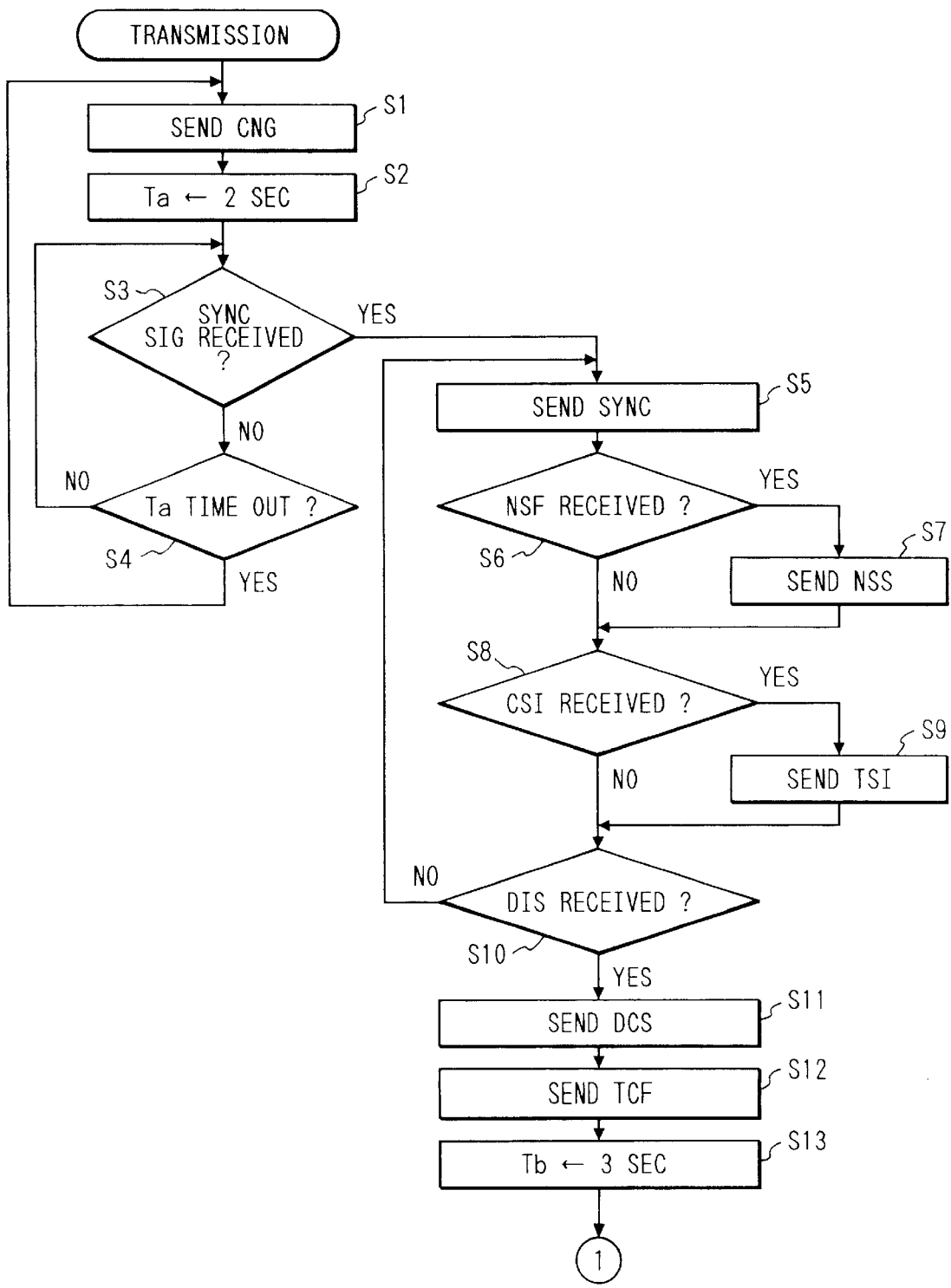
FIG. 4 shows a flow chart in a sending station in the first embodiment.
Figure 5:
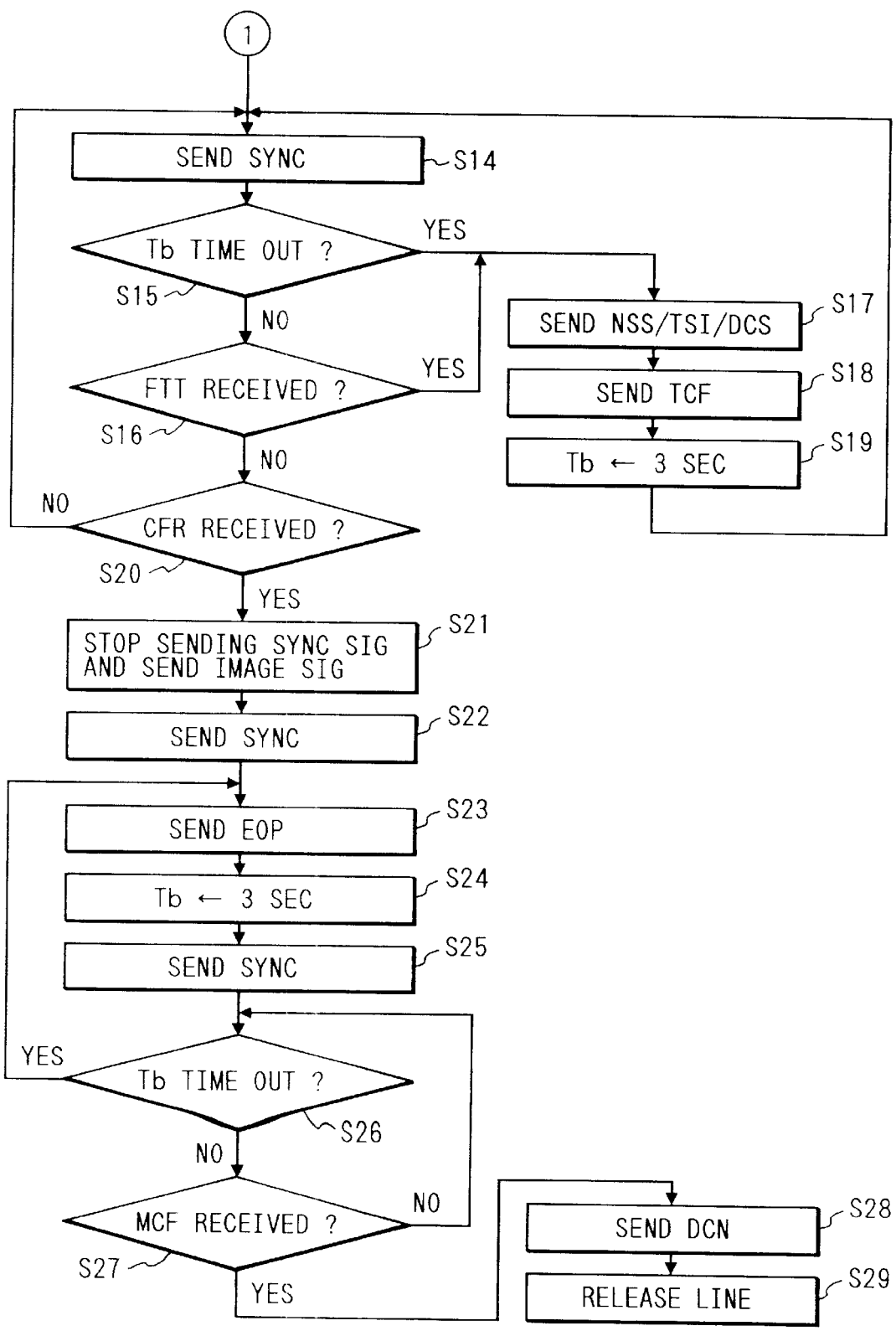
FIG. 5 shows a flow chart in the sending station in the first embodiment.

First, referring to the flow charts of FIGS. 4 and 5, a transmission operation of the communication apparatus is explained.

First, at S1, it sends the CNG signal (a tone signal of 1100 Hz), and at S2, it sets two seconds to a Ta timer. At S3, it receives the synchronization signal (a repetitive pattern of data 7E) while it monitors the elapse of the time Ta at S4.

When the time Ta has elapsed at S4, the process returns to S1 and it resends the signal CNG. When the synchronization signal modulated by V.21 is detected at S3, it starts to send the synchronization signal modulated by V.21 at S5.

It then receives the NSF/CSI/DIS signals modulated by V.21 and sent from the sending station while it send the signal modulated by V.21 at S6, S8 and S10. If it receives the NSF signal at S6, it sends the NSS signal at S7. When it receives the CSI signal at S8, it sends the TSI signal at S9. When it receives the DIS signal at S10, it sends the DCS signal at S11. If it does not receive the NSS signal or the TSI signal before the reception of the DIS signal, it means it has sent the synchronization signal at S5. Various protocol data may be received even during the sending of the NSS signal and the TSI signal.

After it has sent the DCS signal at S11, it sends a training signal and the TCF signal which is the high rate signal with an interval of 50 ms at S12.

At S13, it sets three seconds to a Tb timer, and at S14 it sends the synchronization signal with an interval of 50 ms.

At S15, S16 and S20, it receives an acknowledge signal modulated by V.21 while it watches the elapse of the time Tb. In the routines at S14, S15, S16 and S20, if the time Tb has elapsed or if it receives the FTT signal, it sends at S17 the same signal as that it sent at S7, S9 and S11.

For example, when it receives the DIS signal without receiving the NSF signal, it means that it has not sent the NSF signal. In this case, it does not send the NSS signal at S17.

At S18, it sends the training signal and the TCF signal with an interval of 50 ms, and at S19 it set three seconds again to the Ta timer. Then, the process returns to S14 and it sends the synchronization signal.

At S20, when it receives the CFR signal, it stops to send the synchronization signal at S21 and sends the image signal with an interval of 50 ms. When it completes to send the image signal, it sends the synchronization signal modulated by V.21 for one second at S22 and sends the EOP signal at S23.

At S24, it sets three seconds to the Tb timer and starts to send the synchronization signal at S25. While it sends the synchronization signal, it monitors the elapse of the time Tb and receives the MCF signal at S26 and S27. When the time Tb has elapsed, it resends the EOP signal at S23. When it receives the MCF signal, it sends the DCN signal at S28 and releases the line at S29 to terminate the communication.

Figure 6:
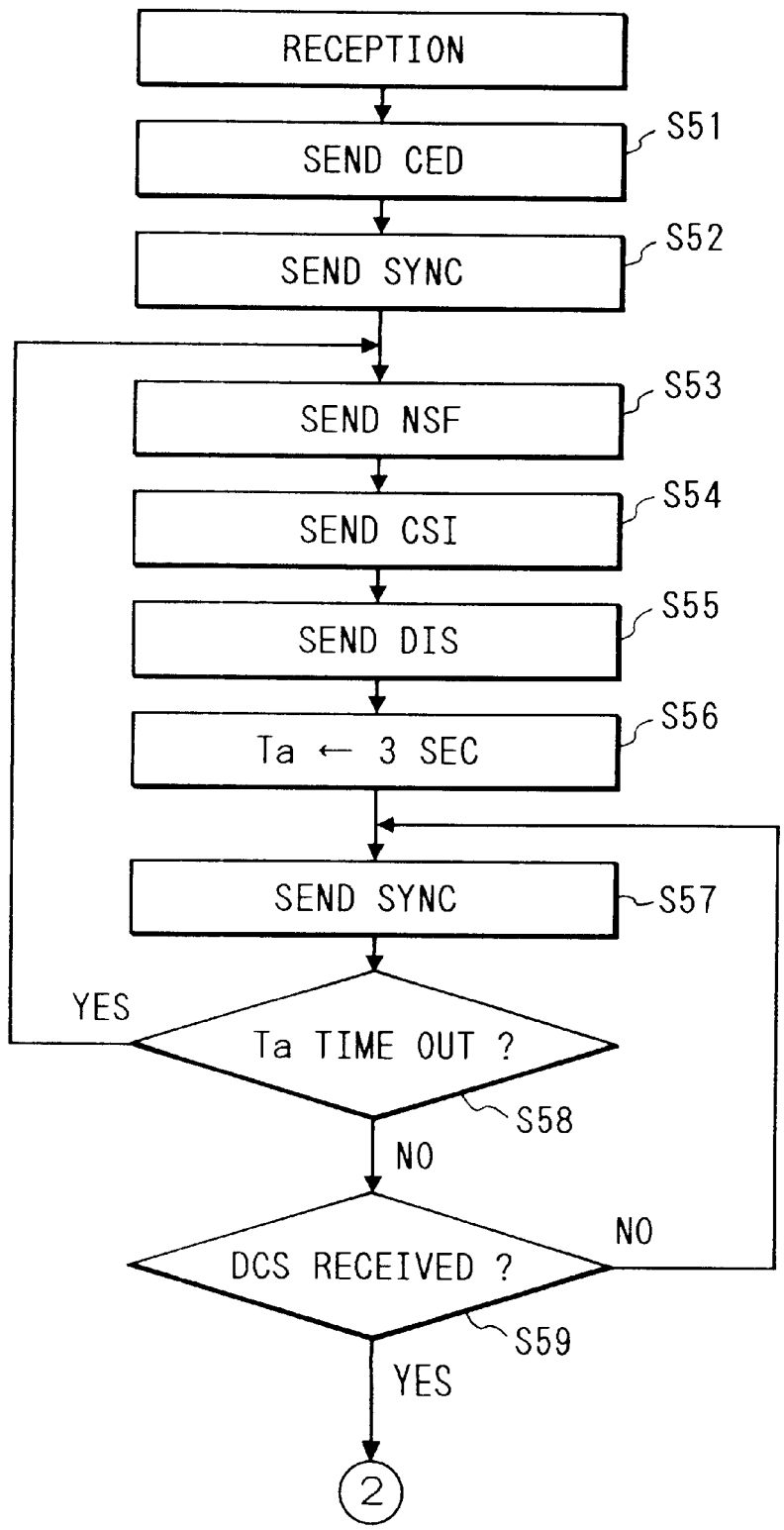
FIG. 6 shows a flow chart in a receiving station in the first embodiment.
Figure 7:
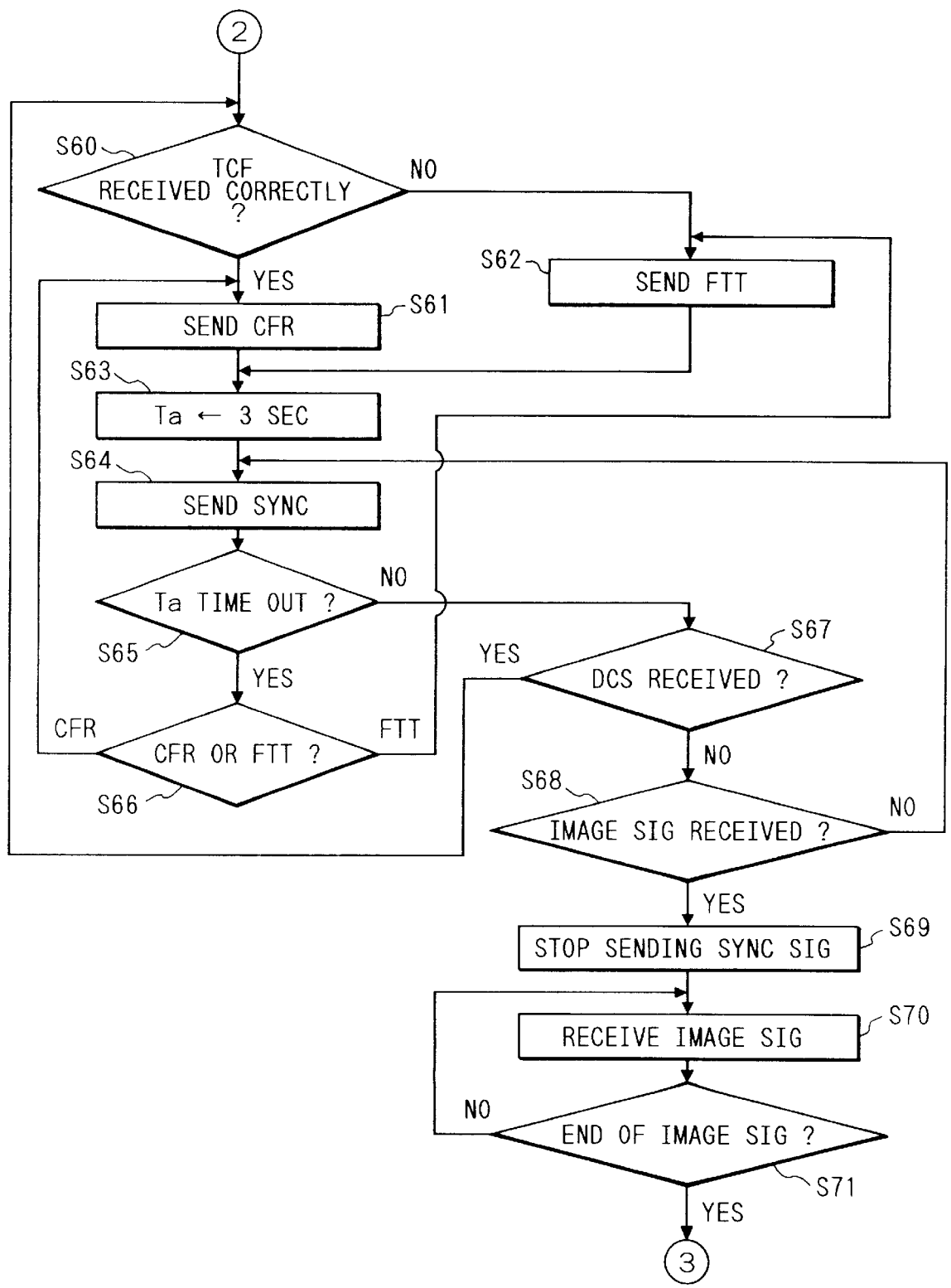
FIG. 7 shows a flow chart in the receiving station in the first embodiment.
Figure 8:
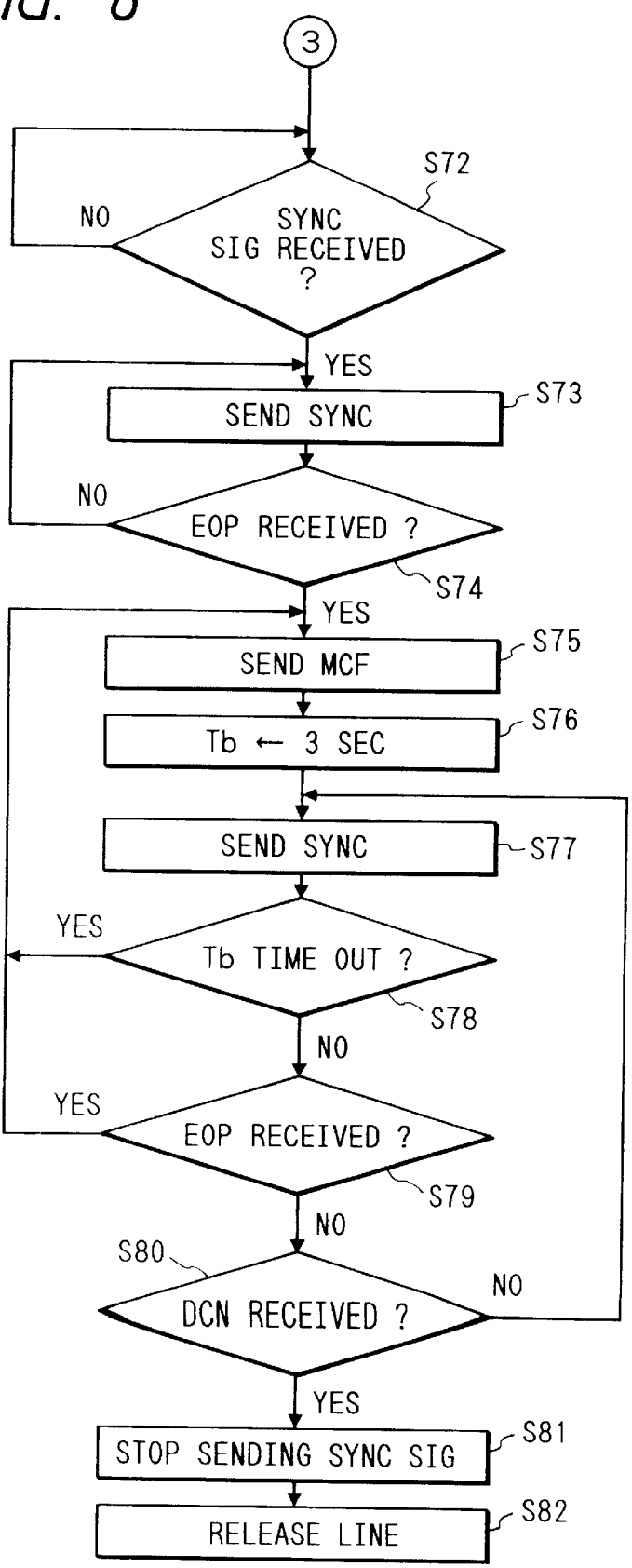
FIG. 8 shows a flow chart in the receiving station in the first embodiment.
Figure 9:
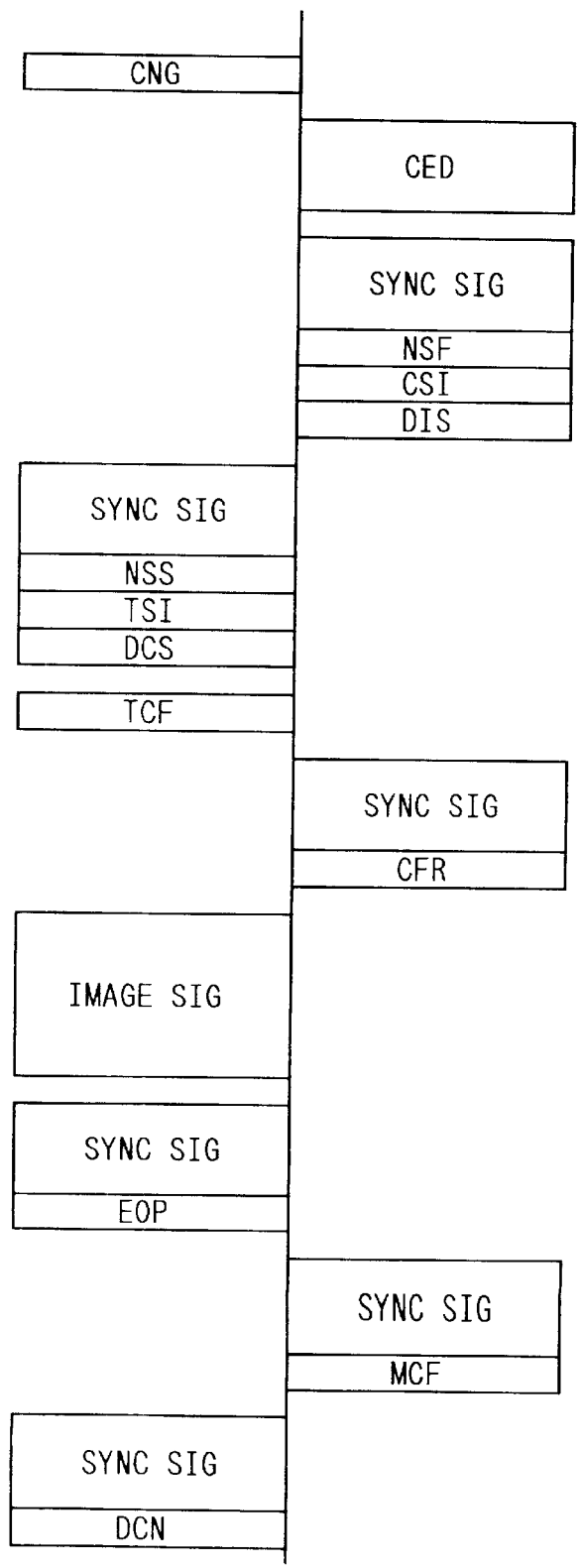
FIG. 9 illustrates a prior art communication protocol.

Referring to the flow charts of FIGS. 6 to 8, the receiving operation of the communication apparatus is explained.

When a call is made through the line, the CPU 2-1 in the communication apparatus detects the reception of the call by the NCU 2-12 and captures it by a CML relay of the NCU 2-12 with DC 60 ohms.

At S51, it sends the CED signal which is an acknowledge signal (single tome of 2100 Hz in the present embodiment) indicating the acknowledgement by the apparatus.

After it has sent the acknowledge signal, it sends the synchronization signal modulated by V.21 for one second at S52. At S54, it sends the CSI signal and at S55 it continues to sent the DIS signal.

After it has sent the DIS signal, it sets three seconds to the Ta timer and it watches the elapse of the time Ta and receives the DCS signal while it sends the synchronization signal at S57, S58 and S59. If it does not receive the DCS signal after the elapse of the time Ta, the process returns to S53 and it resends the NSF/CSI/DIS signals.

When it receives the DCS signal, it receives the TCF signal which is the high rate signal at S60, and if it correctly receives the TCF signal, it sends the CFR signal at S61. If it does not correctly receive, it sends the FTT signal at S62, sets three seconds to the Ta timer at S63 and resends the synchronization signal without interruption.

In routines at S65, S67 and S68, it receives the DCS signal and the high rate signal (image signal) while it monitors the elapse of the time Ta, and when it receives the DCS signal, the process returns to S60 and it receives the TCF signal. When it receives the high rate signal, it stops to send the synchronization signal at S69, receives the image signal at S70 unit it detects the end of the image signal at S71.

When it completes the reception of the image signal, it monitors the reception of the synchronization signal at S72, and when it receives the synchronization signal, it starts to send the synchronization signal at S73 and continues to send the synchronization signal until it receives the EOP signal at S74.

If the time Ta has elapsed at S65, which of the CFR signal and the FTT signal has been sent at S61 or S62 is determined at S66. If it is the CFR signal, the process proceeds to S61, and if it is the FTT signal, the process proceeds to S62.

When it receives the EOP signal, it sends the MCF signal at S75, sets three seconds to the Tb timer at S76 and sends the synchronization signal following to the MCF signal at S77.

At S78, S79 and S80, it receives the EOP signal and the DCN signal while it monitors the elapse of the time Tb, and when it receives the EOP signal, it conducts the steps S75 et seq again, and when it receives the DCN signal, it stops to send the synchronization signal at S81 and releases the line at S82 to terminate the receiving operation.

Figure 10:
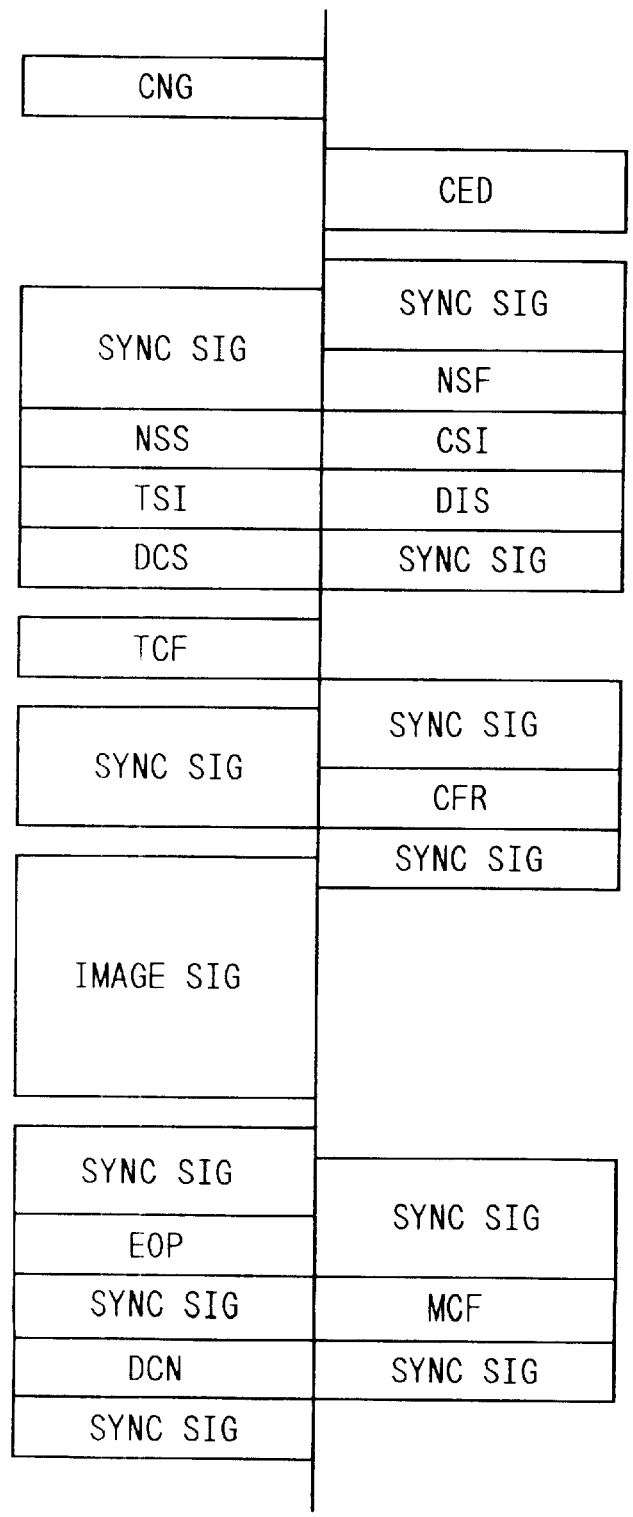
FIG. 10 illustrates a communication protocol in a second embodiment of the present invention.

In the first embodiment, in the receiving operation, the receiving station sends the synchronization signal during the reception of the TCF signal which is the high rate signal from the sending station. In a second embodiment of the present invention shown in FIG. 10, it temporarily stops to send the synchronization signal after the reception of the DCS signal so that it is dedicated to the reception of the high rate signal.

When it receives the TCF signal, it starts to resend the synchronization signal and after the sending of the synchronization signal for one second, it sends the CFR signal.

As a result, the full duplex mode communication is not needed when the high rate signal is received and the data processing of the modem is simplified and the cost of the modem itself is reduced.

Figure 11:
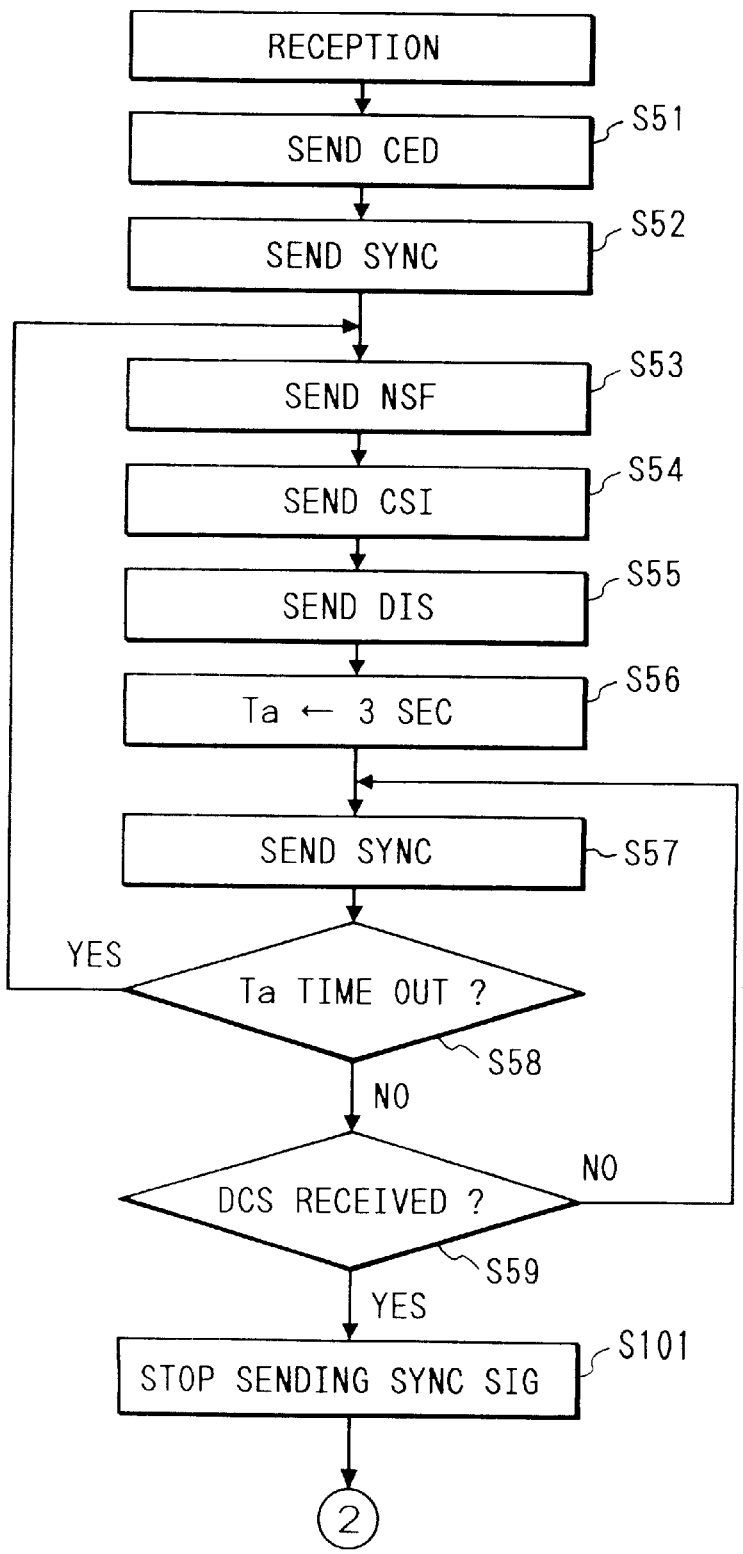
FIG. 11 shows a flow chart in a receiving station in the second embodiment.
Figure 12:
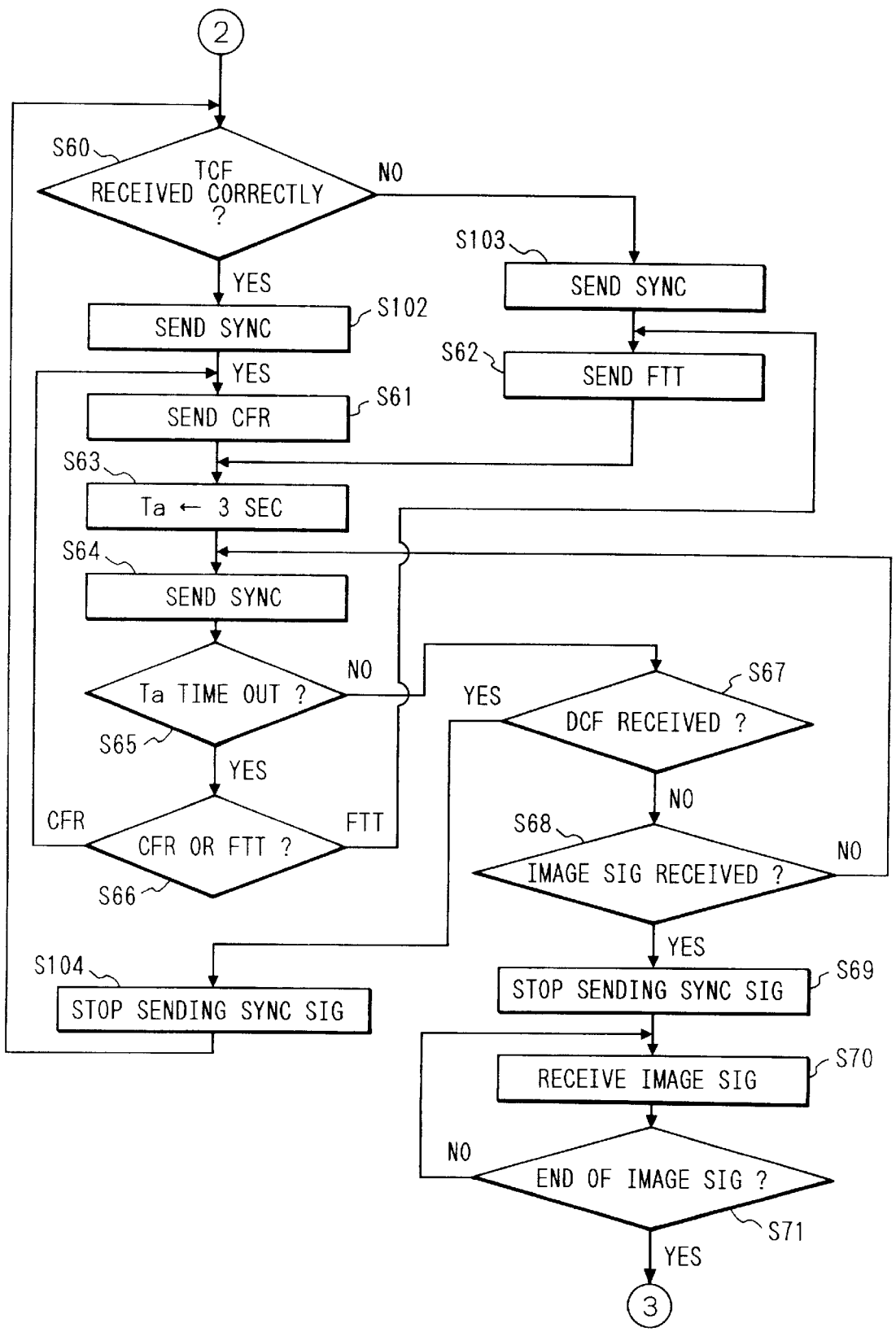
FIG. 12 shows a flow chart in the receiving station in the second embodiment.

In order to implement it, the receiving operation of FIGS. 6 and 7 need be partially modified as shown in FIGS. 11 and 12.

A difference from FIG. 7 resides in that it sends the synchronization signal for one second at S102 and S103 following to S60 and it stops to send the synchronization signal when it receives the DCS signal at S101 and S104 in the post processing of S59 and S67, respectively. Other steps are identical to those of the first embodiment and the same reference numerals are assigned thereto.

In accordance with the above embodiments, the intervals between DIS and CFR, EOP and DCN, NSS and TSI and TSI and DCS in the facsimile protocol are connected by the synchronization signals, and instead of sending the synchronization signal called a preamble for one second after the completion of the reception of the protocol signal, the synchronization signal is sent even after the sending of the protocol signal. Thus, it is not necessary to resend the synchronization signal for one second in order to send the next protocol signal and the time required for the protocol signal can be shortened.

Further, when it is necessary to resend the same DIS, CFR, MCF, EOP, EOM or MPS signal three seconds after the sending of one of those signals in the facsimile protocol because of no acknowledgement from the destination station, it would take an extra time for the synchronization signal if the synchronization signal is temporarily stopped for the resending. In accordance with the above embodiments, the synchronization signal is continuously sent after the sending of the signal until the acknowledge is received so that the communication time in the occurrence of error can be shortened.

In accordance with the above embodiments, when the destination station acknowledges by the FTT signal after the sending of the TCF signal or when the low rate protocol signal should be resent because of no acknowledgement, the synchronization signal is sent after the sending of the TCF signal so that the protocol signal is smoothly resent and the communication time is shortened. Further, the synchronization signal is not sent continuously but the sending of the synchronization signal is stopped as soon as the CFR signal is received and the image signal is sent. Accordingly, the total communication time is shortened.

In accordance with the above embodiments, after the start of the communication by the low rate signal, the synchronization signal is sent except when the protocol signal at low rate such as the DIS, CFR or MCR signal is sent and when the high rate signal such as the TCF signal or the image signal is received so that the full duplex mode communication is not conducted during the reception of the high rate signal. Thus, the modem design is facilitated and the modem cost is reduced although the communication time is approximately one second longer than that when the full duplex communication is conducted during the reception of the TCF signal.

A third embodiment of the present invention is now explained in detail with reference to the drawings.

In the third embodiment, a facsimile apparatus is particularly explained although the present invention is equally applicable to any data communication apparatus having a full duplex communication ability for communicating a protocol signal and data.

Figure 13:
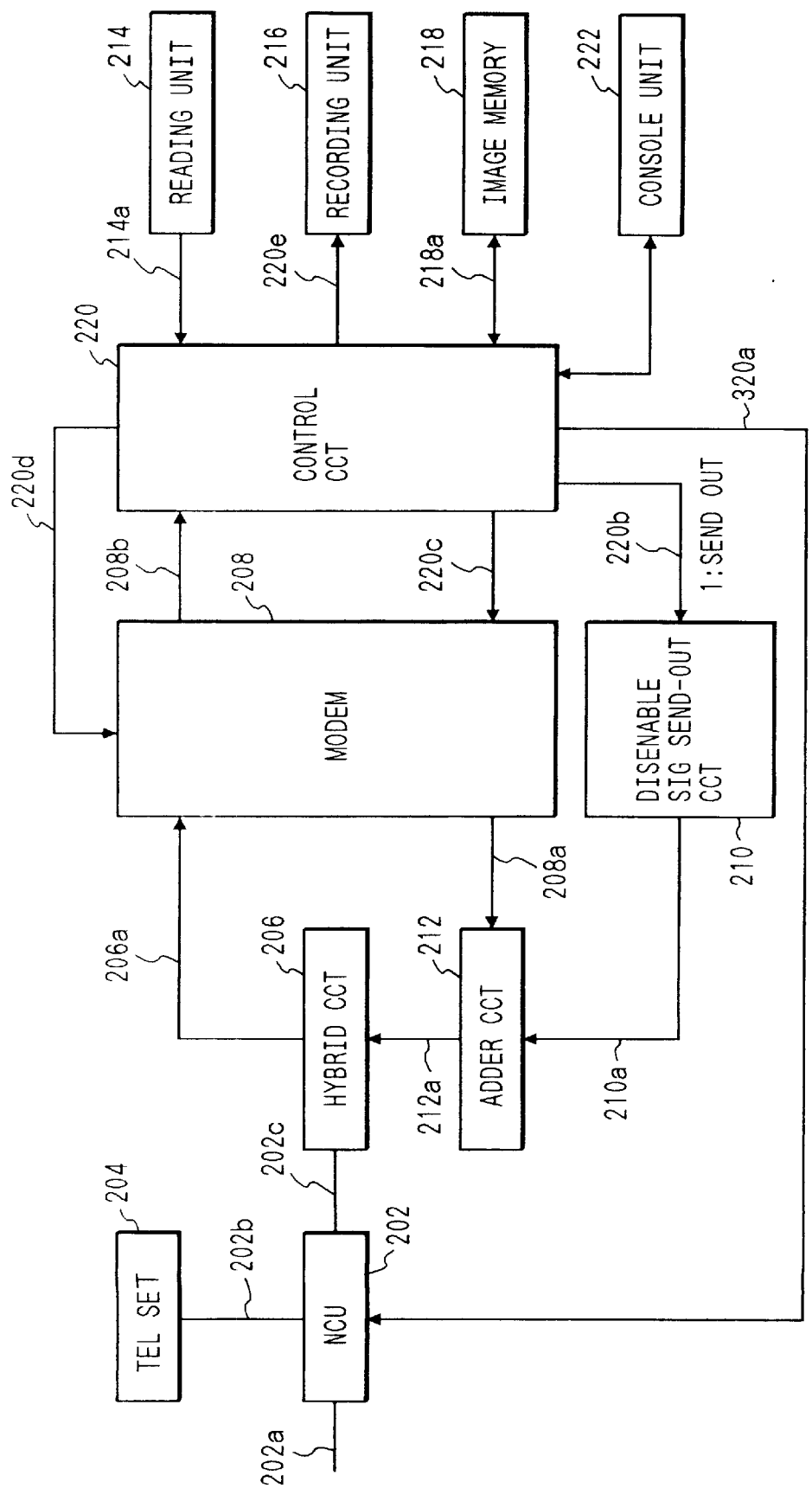
FIG. 13 shows a block diagram of a configuration of a facsimile apparatus in accordance with a third embodiment of the present invention.

FIG. 13 shows a block diagram of a configuration of a facsimile apparatus in accordance with the present embodiment.

Numeral 202 denotes an NCU (network control unit) which comprises a CML relay for selectively connecting a telephone line 202a in a public network to a telephone set 204 or a hybrid circuit 206, a loop forming circuit for forming a line loop of the telephone set 202a and a CI detection circuit for detecting a call signal (CI signal) from the telephone set 202a.

The hybrid circuit 206 separates a transmission signal and a received signal.

Numeral 208 denotes a modem which demodulates the received signal from the hybrid circuit 206 into digital data and outputs it to a control circuit 220, and modulates digital data from the control circuit 220 and outputs it to the hybrid circuit 206 as the transmission signal through an adder 212. The modem 208 has functions of the V-series Recommendation V.8, V.21 and V.34 for the modulation/demodulation of the protocol signal and functions of V.27ter, V.29, V.17 and V.34 for the modulation/demodulation of the image signal. The modulation/demodulation systems and the transmission rates are switched by a control signal from the control circuit 220.

Numeral 210 denotes a disable (disenable) signal sending circuit for sending a disable signal (a 2100 Hz signal or a modulated 2100 Hz signal) for disabling a function of an echo suppressor or echo canceler of the public network to the line 202 through the adder circuit 212, the hybrid circuit 206 and the NCU 202. The disable signal sending circuit 210 sends the disable signal under the control of a control signal from the control circuit 220.

Numeral 214 denotes a read unit for reading a document sheet and numeral 216 denotes a record unit for recording an image signal as an image.

Numeral 218 denotes an image memory which stores read image data and received image data.

Numeral 220 denotes the control circuit which comprises a microcomputer, a ROM and a RAM. The control circuit 220 controls the read unit 214, the record unit 216, the entry of various key signals from a console unit 222, the display of a display unit provided on the console unit 222, the coding and decoding of the image data (the coding and decoding such as MH, MR or MMR), the switching of the modulation/demodulation systems of the modem 208, the switching of the transmission rates, the sending of the signal by the disable signal sending circuit and the communication sequence of the transmission and reception of the protocol signal to be described later and the image data communication.

The third embodiment is generally described below.

Figure 14:
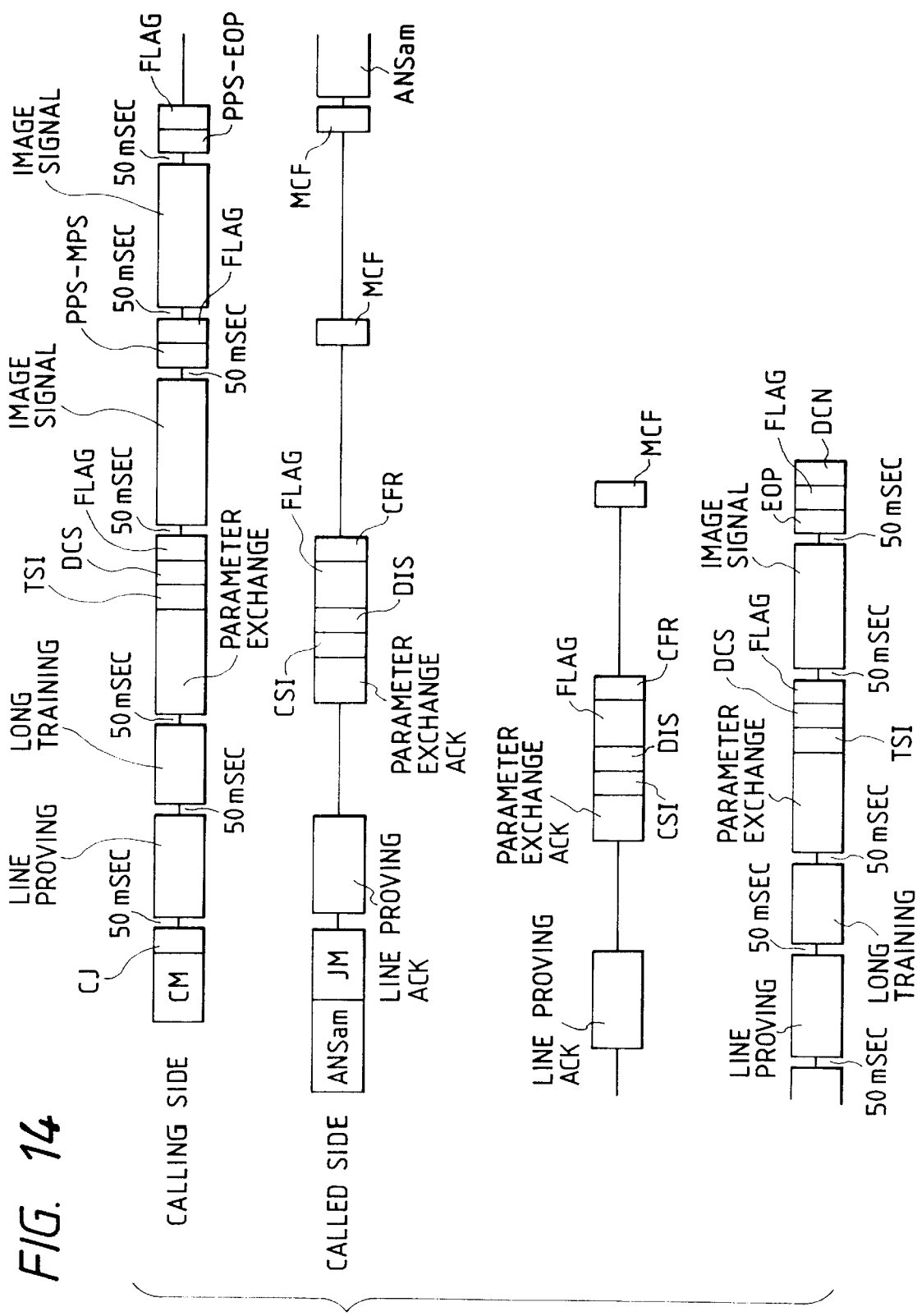
FIG. 14 shows a communication sequence in the third embodiment.

In the third embodiment, the protocol signal is first transmitted and received in the full duplex communication. FIG. 14 shows a communication sequence in the present embodiment.

A called station responds to a call to send an ANSam signal (a 2100 Hz signal modulated by 15 Hz) or a 2100 Hz mono-tone signal (a disable signal to allow the full duplex communication) from the disable signal sending circuit 210 by the ANSam signal or the 2100 Hz mono-tone signal, the function of the echo suppressor or the echo canceler of the public network is disabled to allow the full duplex communication. When the calling station receives the ANSam signal from the called station, it sends a CM signal by the V.8 modulation to inform to the called station the executable transmission modes in the image signal transmission. When the called station receives the CM signal, it stops to send the ANSam signal and sends a JM signal by the V.8 modulation. The called station informs to the calling station by the JM signal a transmission mode which the called station can execute among the executable transmission modes informed by the CM signal. When the calling station receives the JM signal, it stops to send the CM signal and sends a CJ signal by the V.8 modulation. The calling station informs to the called station by the CJ signal the transmission mode which it determined in accordance with the JM signal. When the called station receives the CJ signal, it stops to send the JM signal and starts to receive a line proving signal from the calling station.

On the other hand, after the elapse of 50 ms from the stop of the sending of the CJ signal, the called station sends the line proving signal (a signal modulated by V.34) to check a status of the line 202a. Since the signal interruption is 50 ms, the function of the echo suppressor or echo canceler of the public network is kept disabled. On the other hand, when the called station receives the line proving signal, it sends an acknowledge signal (a signal by V.34 modulation) for the line proving signal to inform to the calling station a correction of a subsequent signal send level and an amplitude level and a transmission report. Then, it starts to receive a long training signal from the calling station.

When the calling station receives the acknowledge signal, it stops to send the line proving signal and after the elapse of 50 ms from the stop of the sending, it sends the long training signal by V.34 modulation. In response to the long training signal, the called station adjusts an equalizer of the modem 8 and detects a timing.

After the elapse of 50 ms from the sending of the long training signal, the calling station sends a parameter exchange signal by V.34 modulation. When the called station receives the parameter exchange signal, it sends a parameter exchange acknowledge signal by V.34 modulation to inform to the calling station a correction of a subsequent link and a bit rate. Following to the parameter exchange acknowledge signal, the called station sends CSI/DIS signal of the T.30 Recommendation by V.34 modulation and sends a flag (dummy signal) until it receives TSI/DCS signals of the T.30 Recommendation from the calling station.

When the calling station receives the CSI/DIS signals, it stops to send the parameter exchange signal and sends the TSI/DCS signals by V.34 modulation and sends a flag until it receives a CFR signal from the called station. On the other hand, when the called station receives the TSI/DCS signals from the calling station, it stops to send the flag and sends the CFR signal by V.34 modulation. During the transmission and reception of the DIS/DCS signals, the called station informs to the calling station that a document sheet image to be sent from the called station to the calling station after the completion of the reception has been set (a notice of replacement of transmission and reception). The calling station recognizes the transmission of the image from the called station after the completion of the transmission.

When the calling station receives the CFR signal, it stops to send the flag, and after the elapse of 50 ms, it sends the image signal in the transmission mode established by the previous protocol, and the called station receives the image signal in the established transmission mode. The transmission and reception of the image signal may be error retransmission communication by the full duplex communication or error retransmission communication (ECM communication) by the half duplex communication.

When the calling station sends the next page of image signal in the same transmission mode after the transmission of one page of image signal, it sends a PPS-MPS signal (for the ECM of the T.30 Recommendation) after the elapse of 50 ms from the completion of the transmission of the image signal and sends a flag until it receives an MCF signal from the called station. When the next page is to be transmitted with the transmission mode being changed, the calling station sends a PPS-EOM signal instead of the PPS-MPS signal.

When the called station receives the PPS-MPS signal following to the image signal and the image signal is correctly received, it sends the MCF signal and starts to receive the next page of image-signal.

When the calling station receives the MCF signal, it stops to send the flag and after the elapse of 50 ms, it sends the next page of image signal. If it is the last page, it sends the PPS-EOP signal after the elapse of 50 ms from the completion of the sending of the image signal of the last page and sends a flag until it receives the MCF signal from the called station. In the above communication process, there occurs no signal interruption of 50 ms or longer and the function of the echo suppressor or echo canceler is kept disabled.

Figure 15:
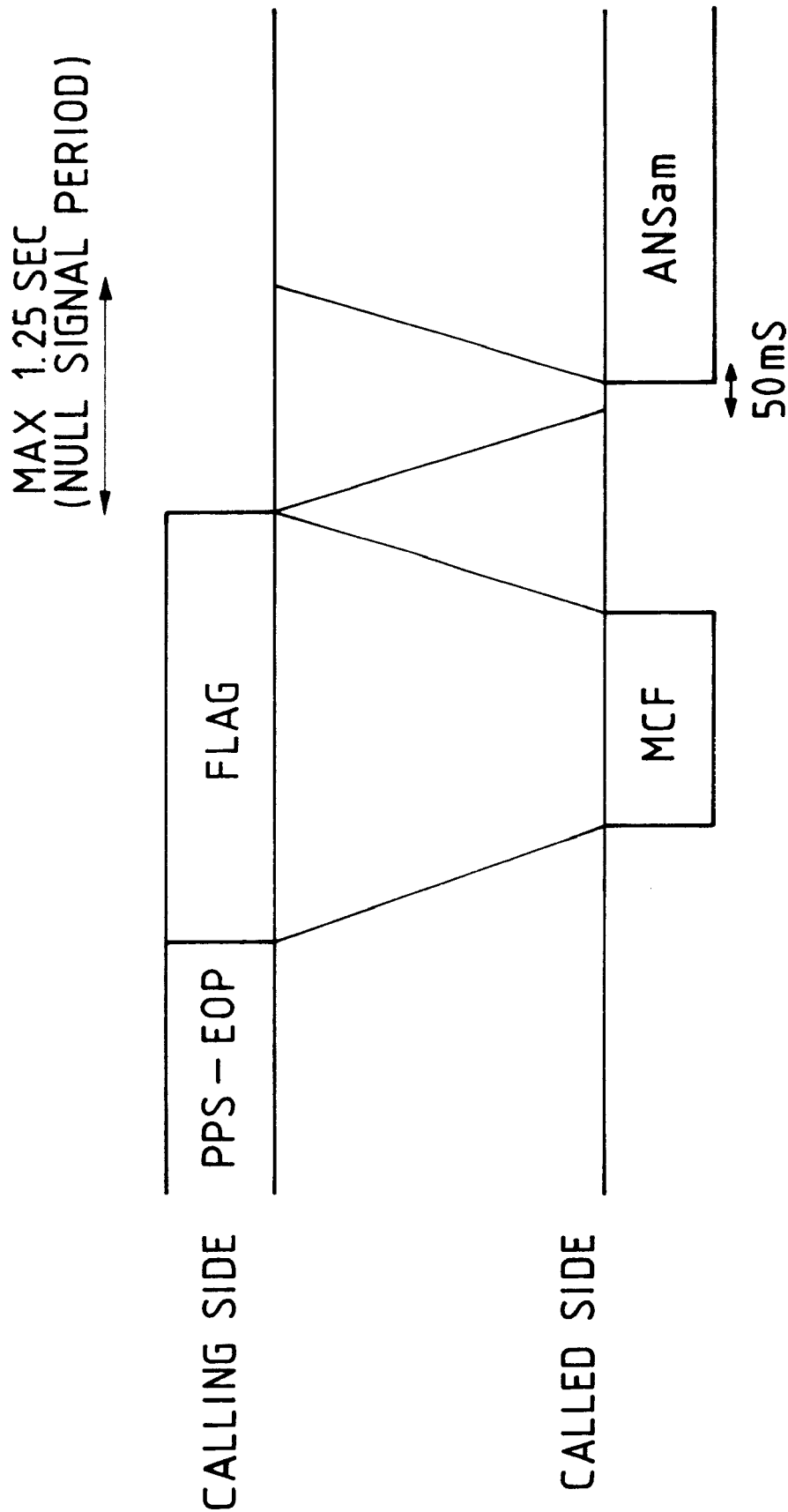
FIG. 15 illustrates the occurrence of signal interruption in switching the transmission and the reception.

When the calling station receives the MCF signal from the called station, it stops to send the flag and moves to a reception protocol by the transmission/reception replacement. When the receiving station detects the stop of the sending of the flag from the calling station, it determines that the MCF signal has been correctly received by the calling station and moves to a transmission protocol of the image signal by the transmission reception replacement. If a one-way circuit delay of 0.6 sec is included in the detection of the stop of the sending of the flag from the calling station, the signal interruption (non-signal period) of 1.25 second at maximum takes place as shown in FIG. 15 and the function of the echo suppressor may be enabled. In the present embodiment, in the transmission/reception replacement, when the called station detects the stop of the flag, it resends the ANSam signal 50 ms later to disable the function of the echo suppressor or echo canceler. After the elapse of 50 ms from the sending of the ANSam signal, it sends the line proving signal and conducts the communication sequence of the same protocol as that described above.

In this manner, in the full duplex communication, the occurrence of the signal interruption of 100 ms or longer is minimized and the sending of the disable signal to disable the function of the echo suppressor is minimized.

FIGS. 16 to 20C show flow charts of a control operation of the control circuit 220 to execute the above process.

First, the control circuit 220 initializes the respective units in a step S301 (FIG. 16) and stands by.

In steps S302 and S303, it determines the presence/absence of a call (CI detection) and the presence/absence of a transmission request. If none of them is detected, it executes another process in a step S304 and returns to the step S302. If it detect a call, it moves from the step S302 to a step S305 to start a reception process. If it detects a transmission request, it moves to a step S335 (FIG. 19) to start a transmission process.

In a step S305, it turns on a CML relay of the NCU 202 to connect the line 202a to the hybrid circuit 206 to form a line loop. In a step S306, it waits until the line state is stabilized (0.5 sec wait) and in steps S307 and S308, it sets the modem 208 to the V.8 mode and sends the ANSam signal until it receives the CM signal. When it receives the CM signal, it sends the JM signal until it receives the CJ signal in steps S309 and S310. When it receives the CJ signal, it sets the modem 208 to the V.34 mode in a step S311, and in steps S311 to S314 (FIG. 17A), it causes the modem 208 to receive the line proving signal, send the line proving acknowledge signal and receive the long training signal.

In a step S315, when it detects the end of the reception of the long training signal, it receives the parameter exchange signal in a step S316. When it receives the parameter exchange signal, it sends the parameter exchange acknowledge signal and sends the NSF/CSI/DIS signals in steps S317 and S318. In steps S319 and S320, it sends the flag until it receives the NSS/TSI/DCS signals. If a document sheet to be transmitted is set on the read unit 214 or image data to be transmitted is set in the image memory 218, it sets the bit 9 of the DIS signal to '1' to inform it to the calling station.

In a step S320, when it receives the NSS/TSI/DCS-signals and the communication in the transmission mode set by protocol signal transmitted and received so far is good, it sends the CFR signal in a step S321 and starts to receive the image signal in a step S322.

In a step S322, it controls the reception of the image signal, the decoding of the received image data and the recording of the received image. In steps S323, S324 and S325, it determines the reception of the PPS-MPS/PPS-EOM/PPS-EOP (for the ECM mode) signals, and if none of the signals is received, it continues to receive the image signal.

In the step S323, if it receives the PPS-MPS signal and the image is good received in the step S322, it sends the MCF signal in a step S326, and then, moves to the step S322 to receive an image signal of the next page.

If it receives the PPS-EOM signal in the step S324, it moves to the step S314 to update the transmission mode.

Figure 18:
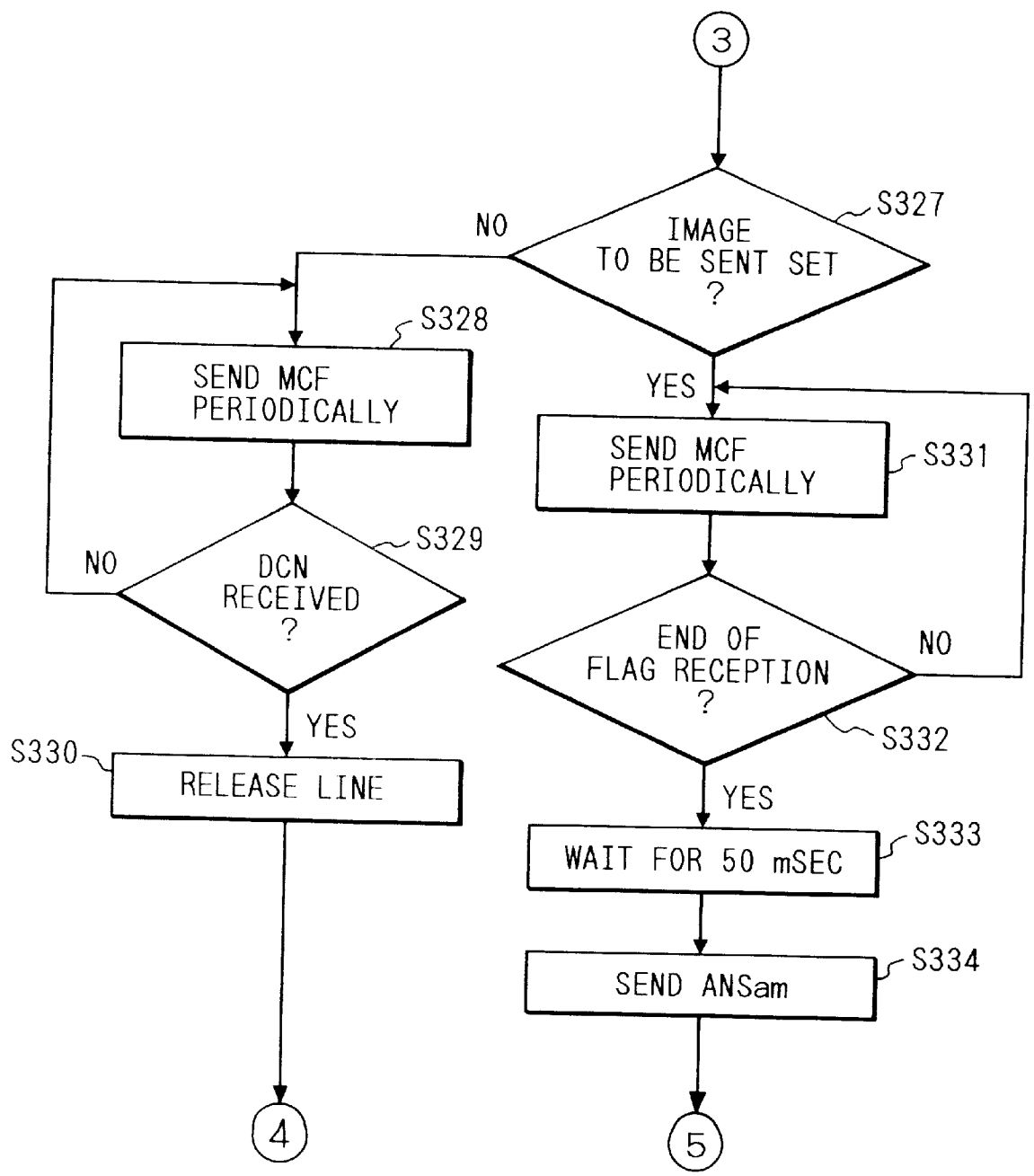
FIG. 18 shows a flow chart of a control operation in the third embodiment.

If it receives the PPS-EOP signal in the step S325, it moves to a step S327 (FIG. 18).

In the step S327, it determines if the image to be transmitted is set in the read unit 214 or the image memory 218, and if the image to be transmitted is not set, it periodically sends the MCF signal until it receives the DCN signal in steps S328 and S329. When it receives the DCN signal, it releases the line in a step S330 and switches the line 202a to the telephone set 204 and then returns to the stand-by state of the step S302.

If the image to be transmitted is set in the step S327, it periodically sends the MCF signal until it determines the end of the reception of the flag in steps S331 and S332. When it determines the end of the reception of the flag in the step S332, it waits for 50 ms in a step S333 and resends the ANSam signal in a step S334 to disable the function of the echo suppressor or echo canceler of the public network, and it moves to a step S341 (FIG. 19).

Figure 19:
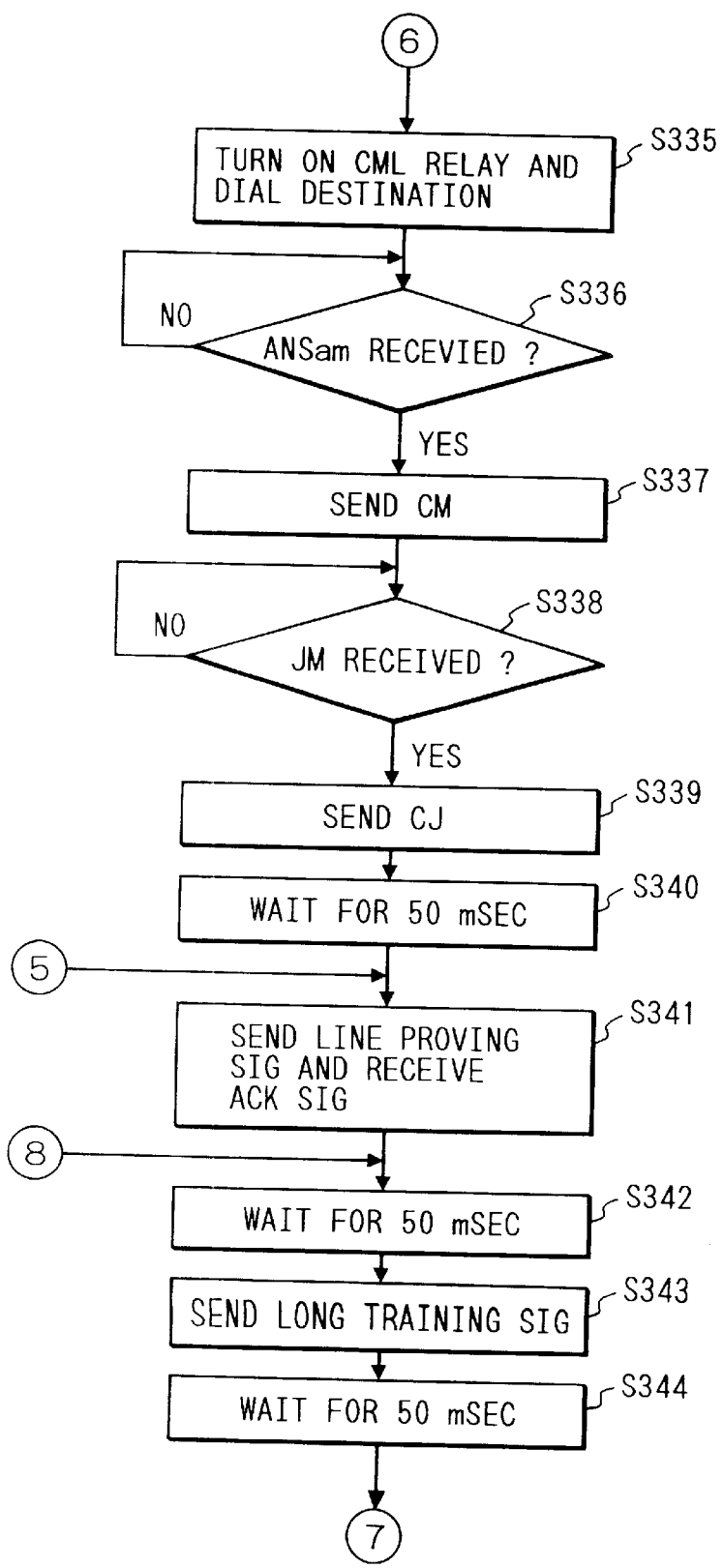
FIG. 19 shows a flow chart of a control operation in the third embodiment, FIG. 20, which is comprised of FIGS. 20A to 20C, shows a flow chart of a control operation in the third embodiment.

When it detects the transmission request in the step S303, it moves to the step S335 (FIG. 19). In the step S335, it turns on the CML relay of the NCU 202 to switch the line 202a to the hybrid circuit 206 to form the line loop. It calls (dials) the destination station entered through the console unit 222 and receives the ANSam signal in a step S336.

In the step S336, when it receives the ANSam signal, it sets the modem 208 to the V.8 mode and sends the CM signal until it receives the JM signal in steps S337 and S338.

Figures 20, 20A:
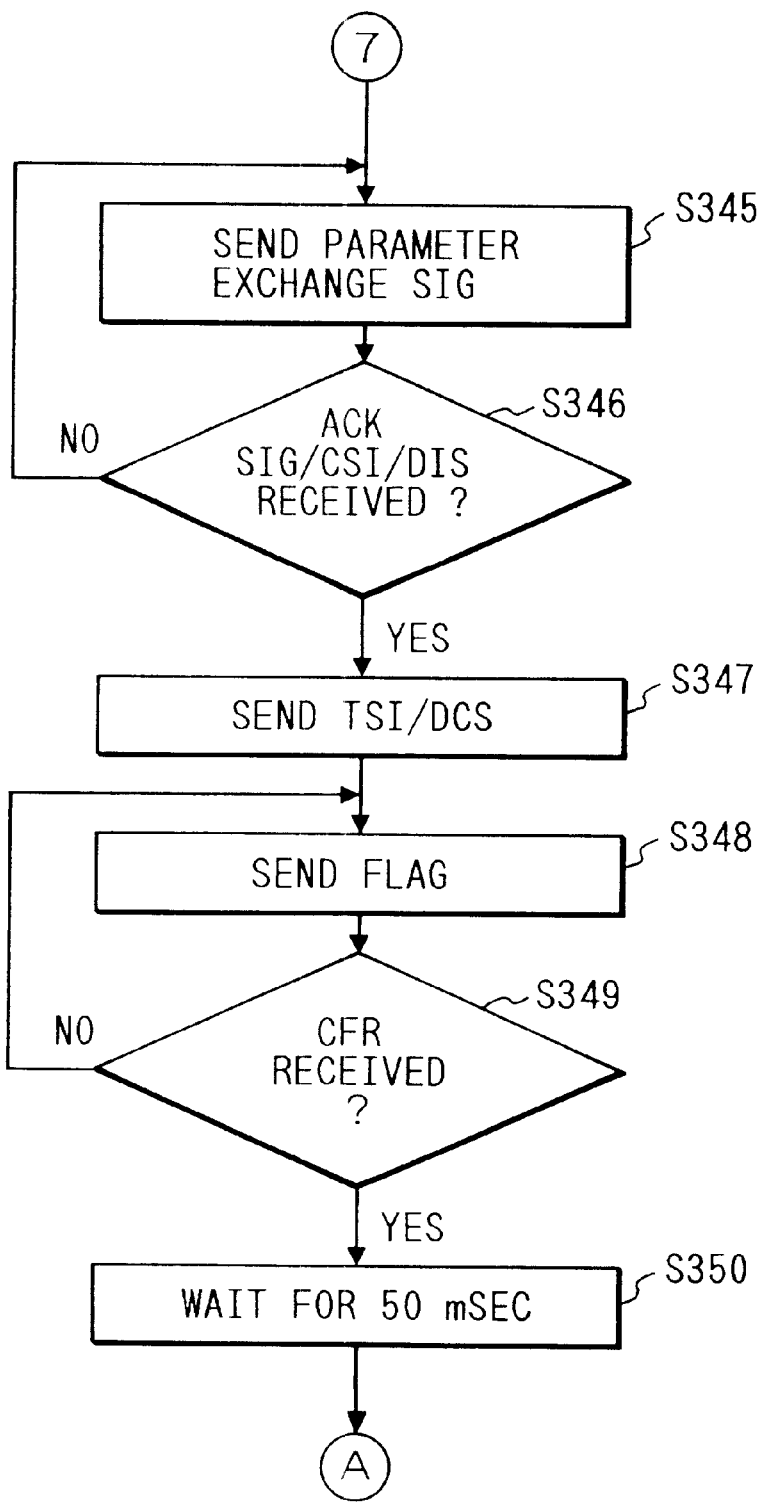
Figure 20B:
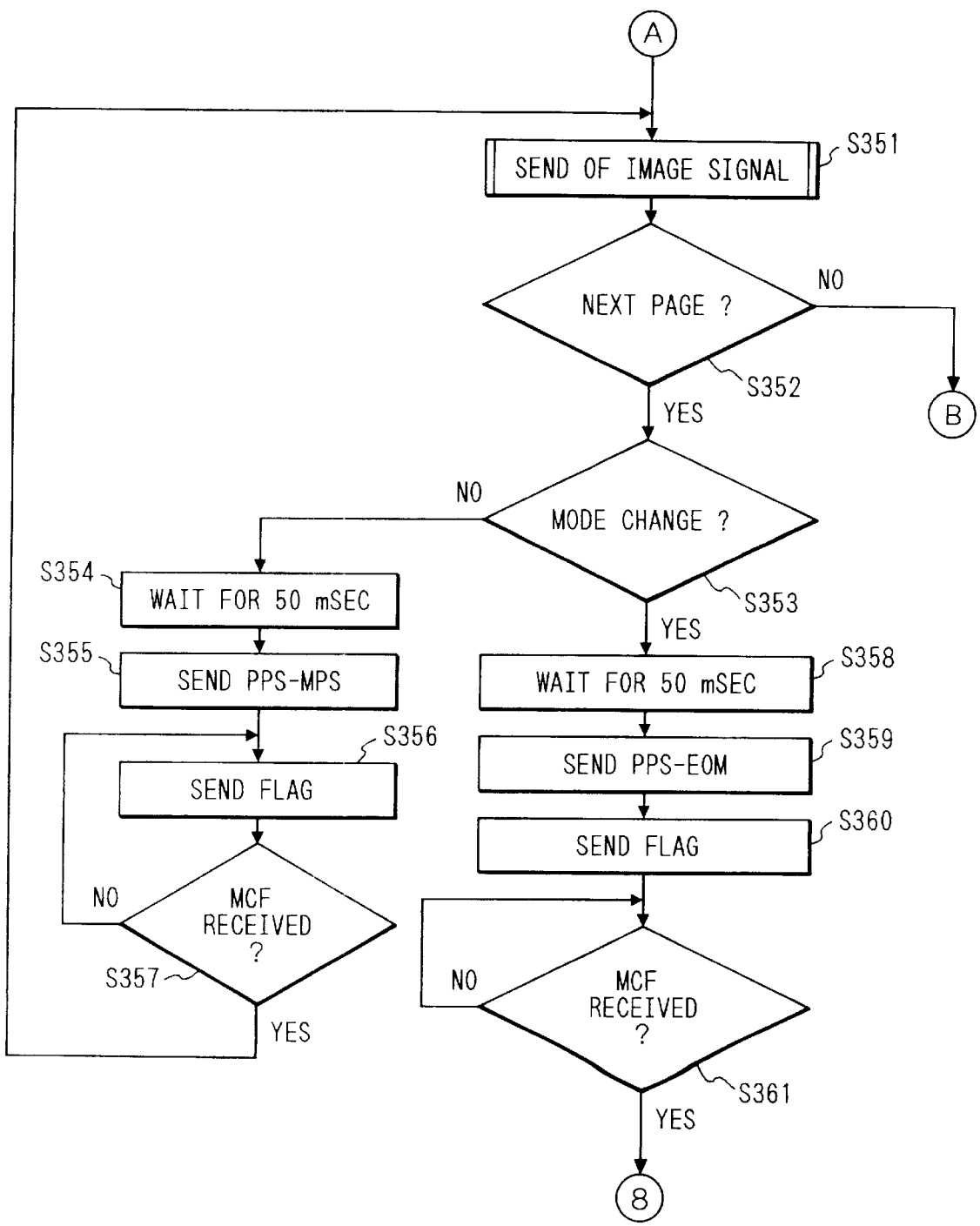
Figure 20C:
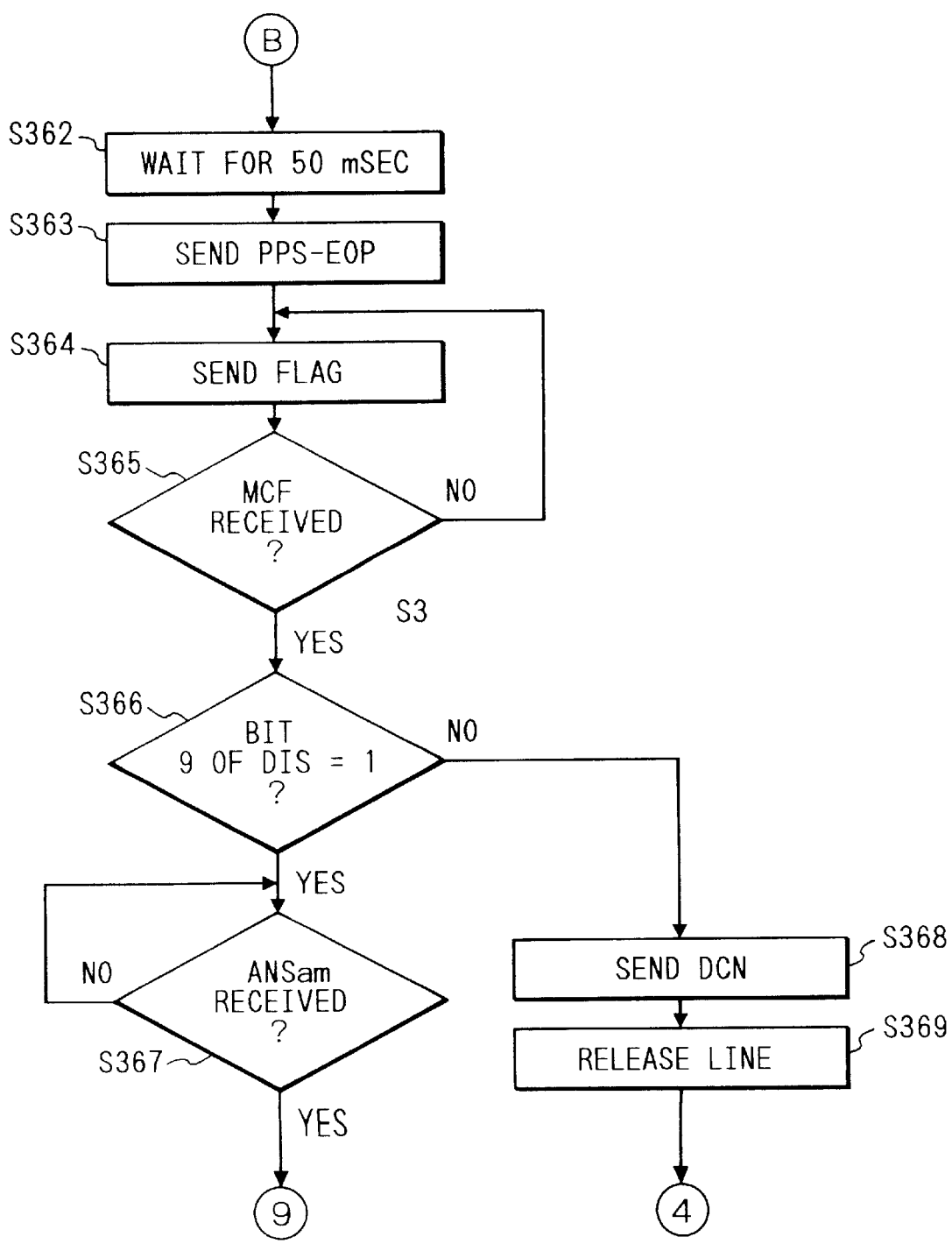

In the step S338, when it receives the JM signal, it sends the CJ signal in a step S339. At the end of the sending of the CJ signal, it waits for 50 ms in a step S340 and sets the modem 208 to the V.34 mode in a step S341 to cause the modem 208 to send the line proving signal and receive the acknowledge signal for the line proving signal. When it completes the sending of the line proving signal, it waits for 50 ms in a step S342 and causes the modem 208 to send the long training signal in a step S343. When it completes the sending of the long training signal, it waits for 50 ms in a step S344 and sends the parameter exchange signal until it receives the parameter exchange acknowledge signal and NSF/CSI/DIS signals in steps S345 and S346 (FIG. 20A).

In the step S346, when it receives the parameter exchange acknowledge signal and the NSF/CSI/DIS signals, it sends the NSS/TSI/DCS signals in a step S348. In steps S348 and S349, it sends the flag until it receives the CFR signal.

In the step S349, when it receives the CFR signal, it waits for 50 ms in a step S350 and sends one page of image signal in the transmission mode established by the previous protocol in a step S351. At the end of the sending of one page of image signal, it determines the presence/absence of the next page in a step S352. If the next page is present, it determines if mode change has been conducted by an operator in a step S353, and if the mode change has not been conducted by the operator, it waits for 50 ms in a step S354 and sends the PPS-MPS signal in a step S355. In steps S356 and S357, it sends the flag until it receives the MCF signal, and when it receives the MCF signal, it moves to the step S351 to send the next page of image signal.

In the step S353, if the mode change has been conducted, it waits for 50 ms in a step S358 and sends the PPS-EOM signal in a step S359. In steps S360 and S361, it sends the flag until it receives the MCF signal, and when it receives the MCF signal, it moves to the step S342 (FIG. 19) to change the transmission mode.

In the step S352, if the next page is not present, it waits for 50 ms in a step S362 and sends the PPS-EOP signal in a step S363. In steps S364 and S365, it sends the flag until it receives the MCF signal, and when it receives the MCF signal, it determines in a step S366 whether the ninth bit of the facsimile information field of the DIS signal received in the step S346 is '1' or not, and if the bit 9 of the DIS signal is '1', it sends the DCN signal in a step S368 and releases the line in a step S369, and then it returns to the stand-by state of the step S302.

Figure 16:
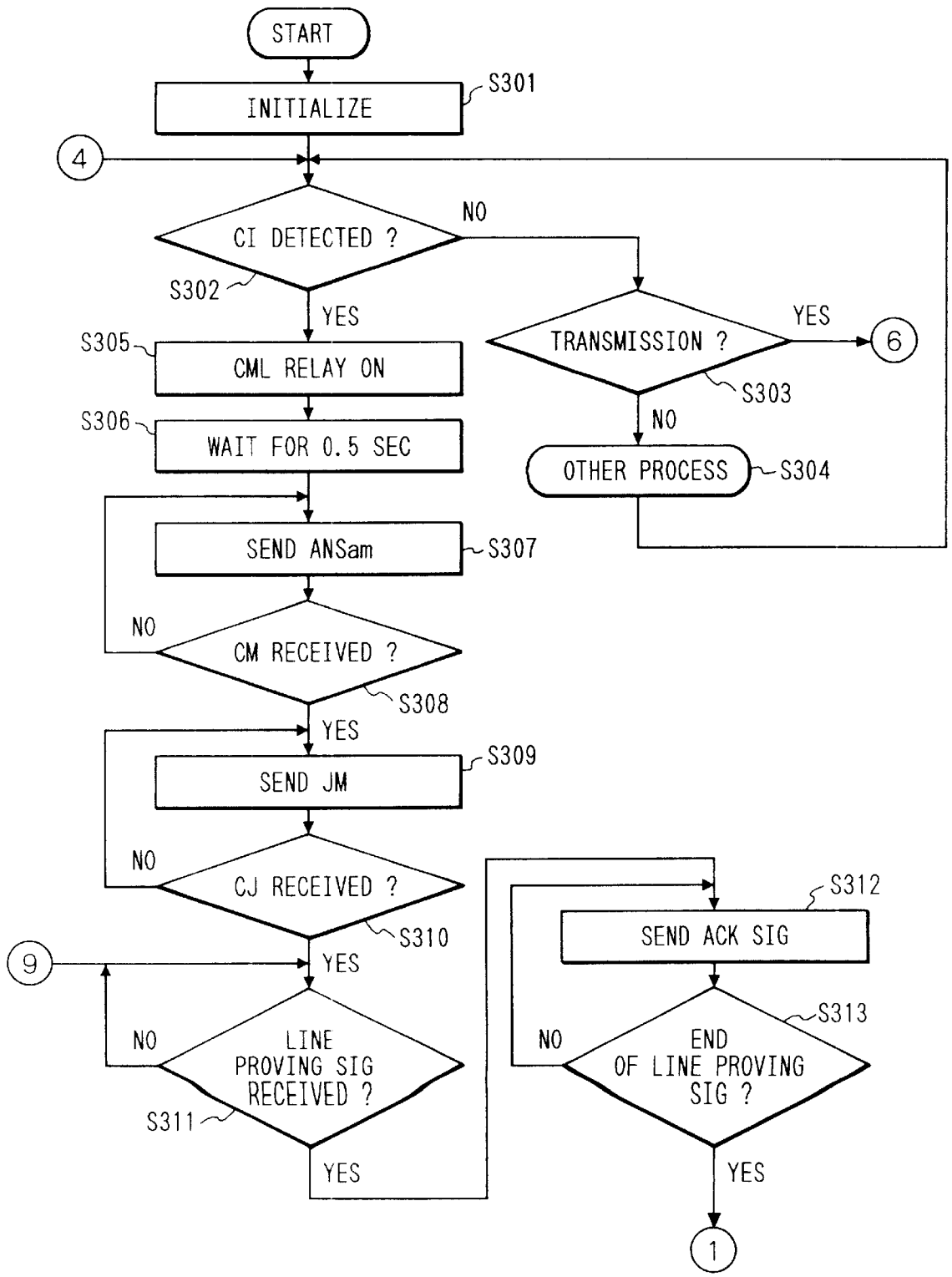
FIG. 16 shows a flow chart of a control operation in the third embodiment, FIG. 17, which is comprised of FIGS. 17A and 17B, shows a flow chart of a control operation in the third embodiment.
Figure 17B:
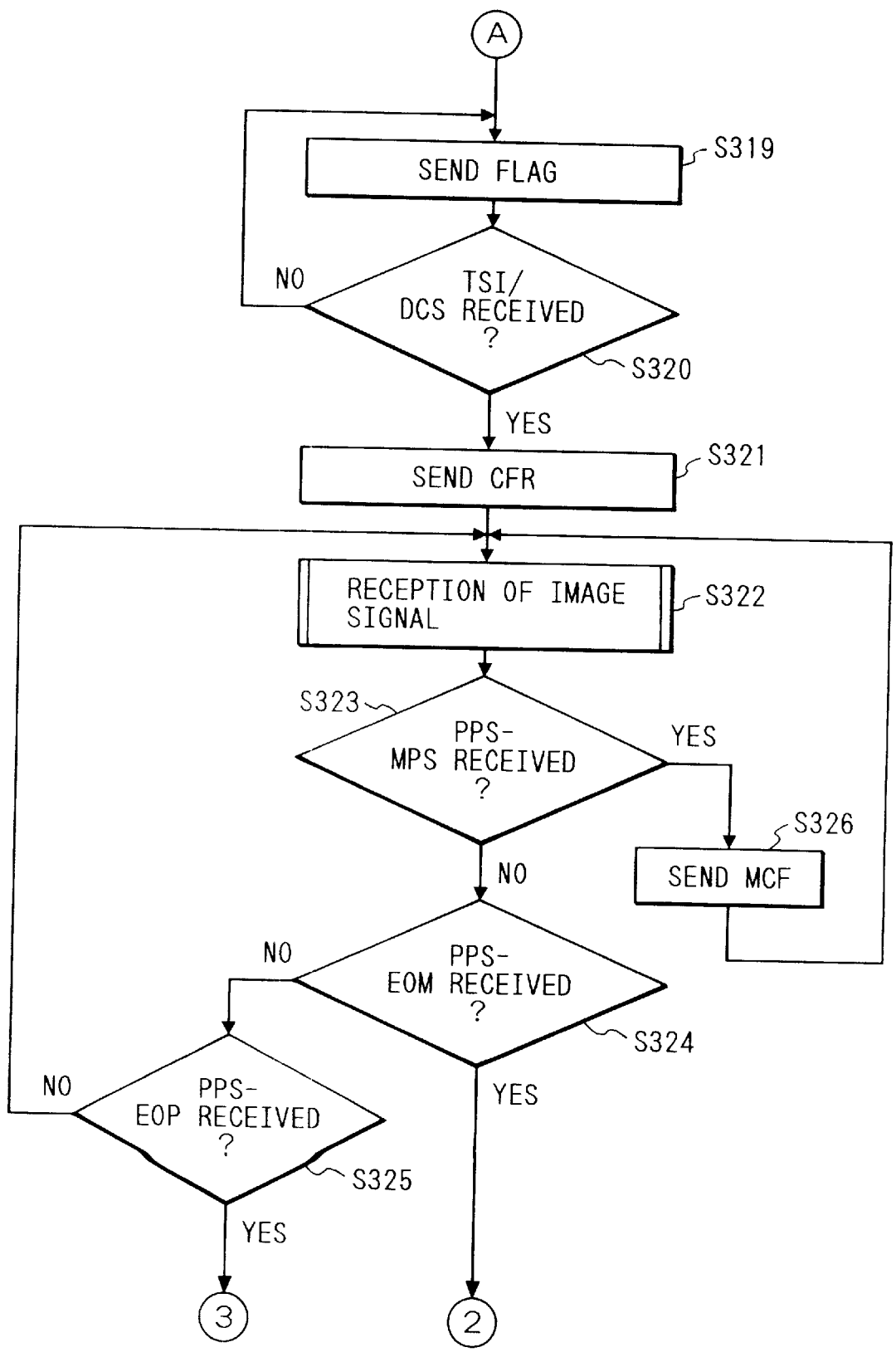

In the step S366, if the bit 9 of the DIS signal is '1', it moves to the reception process, and receives the ANSam signal in a step S367 and then moves to the step S311 of FIG. 16 to conduct the reception process.

In this manner, the communication sequence shown in FIG. 14 is executed.

If an error is included in the received image data, the receiving station sends a resend request signal (PPR) designating the frame data to be resent instead of the MCF signal, and when the sending station receives the PPR signal, it stops to send the flag, and after the elapse of 50 ms, it resends the frame data designated by the received PPR signal.

Figure 21:
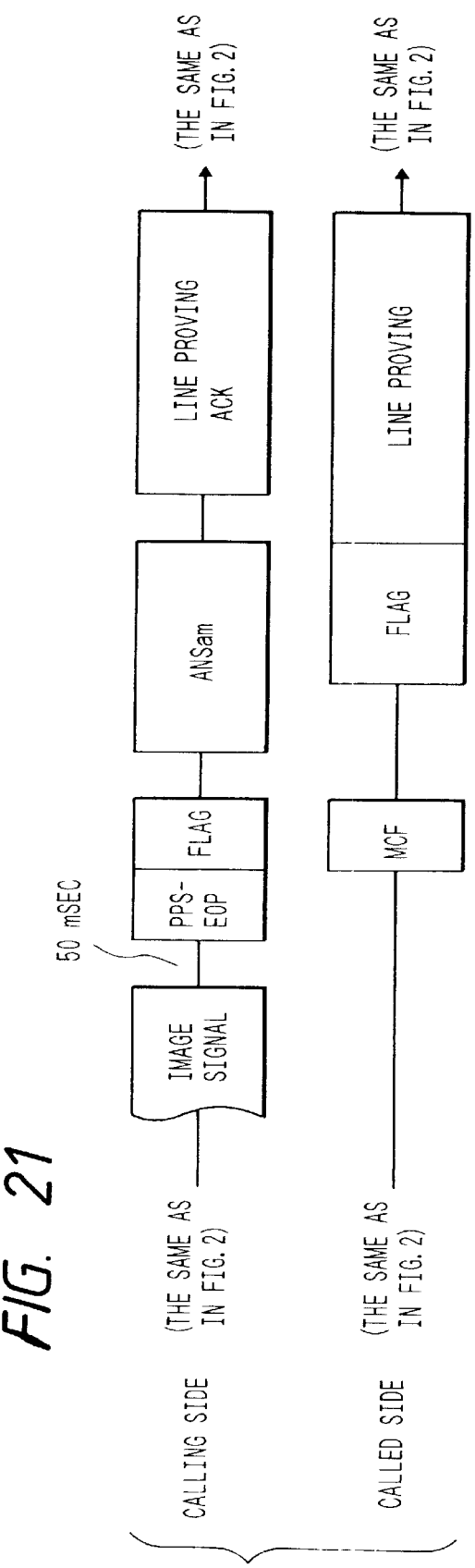
FIG. 21 shows a communication sequence in a fourth embodiment.

In the present embodiment, the called station ANSam signal is sent in the transmission/reception replacement. Alternatively, the ANSam signal may be sent from the calling station. In this case, the called station detects the reception of the ANSam signal in place of the steps S333 and S334 of FIG. 18 and if it determines the reception of the ANSam signal, it sends the flag until the end of the ANSam signal, and stops to send the flag at the end of the ANSam signal and moves to the step S341 of FIG. 19. On the other hand, the calling station sends the ANSam signal for one second in place of the step S367 of FIG. 20C and moves to the step S311 of FIG. 16. FIG. 21 shows a communication sequence when the calling station sends the ANSam signal in the transmission/reception replacement.

Figure 22:
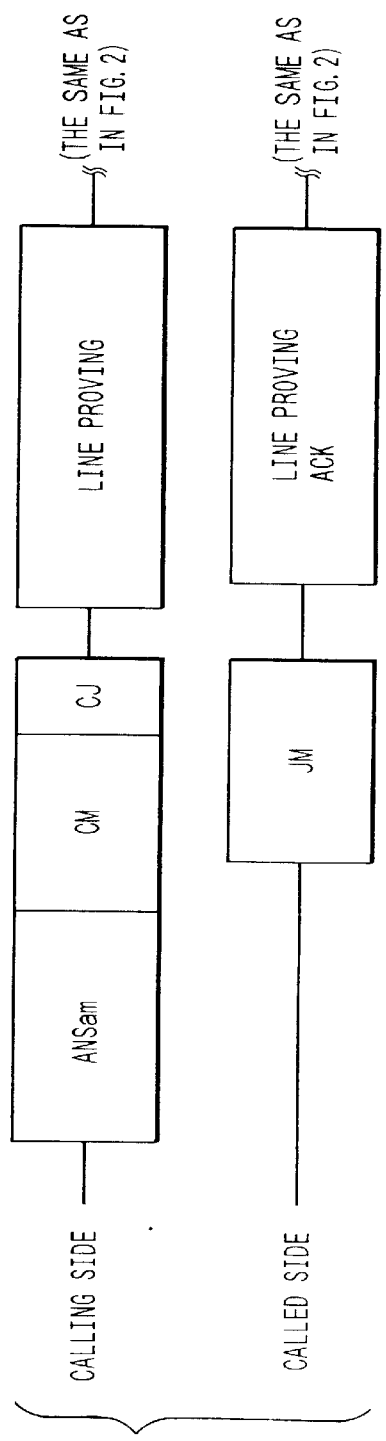
FIG. 22 shows a communication sequence in the fourth embodiment.

In the present embodiment, the called station sends the ANSam when it is called. Alternatively, the calling station may send the ANSam signal. In this case, the calling station waits for 0.5 second after the turn-on of the CML relay in place of the-step S336 of FIG. 19 and sends the ANSam signal for one second and then moves to the step S337. On the other hand, the called station omits the steps S306 and S307 of FIG. 16, and after the turn-on of the CML relay, it receives the CM signal in the step S308. FIG. 22 shows a communication sequence when the calling station sends the ANSam signal when it calls.

Figure 23:
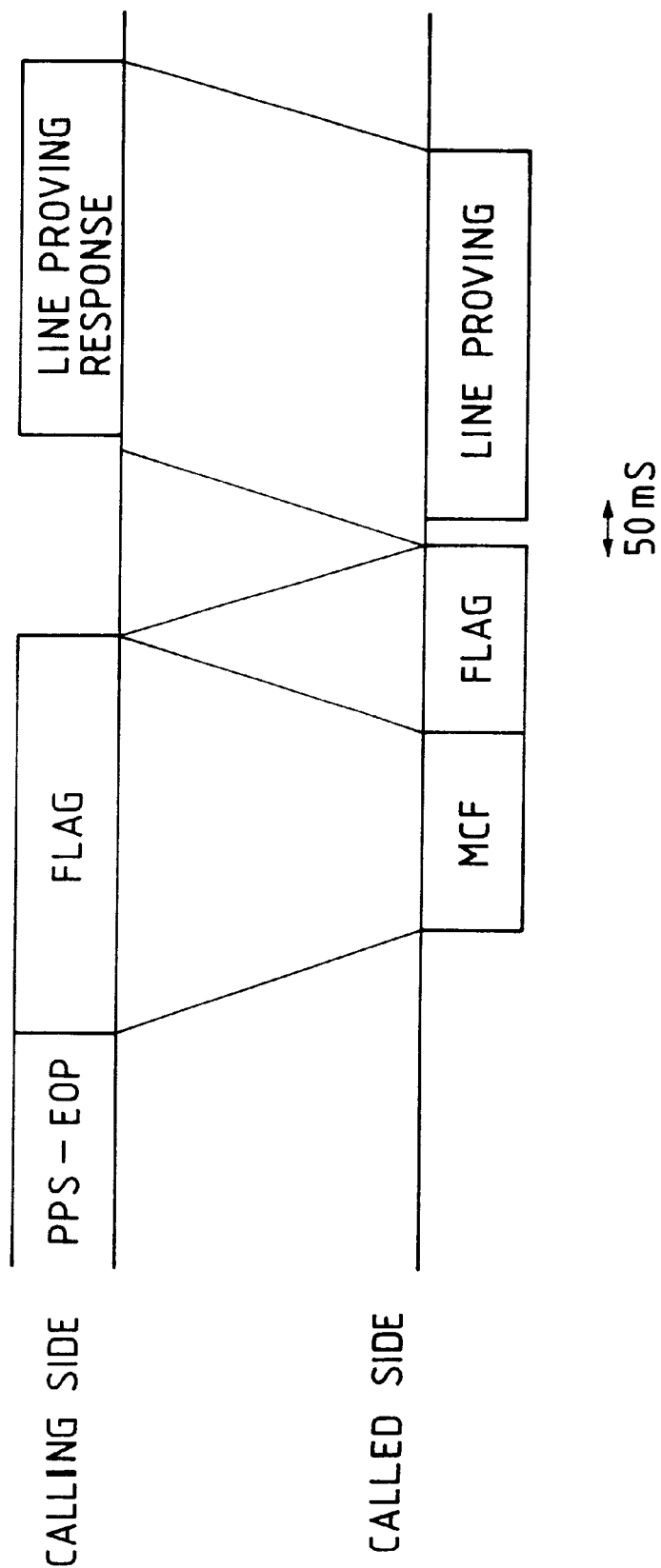
FIG. 23 shows a communication sequence in the fourth embodiment.

In the present embodiment, the ANSam signal is sent in the transmission/reception replacement to disable the function of the echo suppressor or echo canceler of the public network. Alternatively, a flag may be sent in place of the ANSam signal to prevent the signal interruption of 50 ms or longer from occurring. In this case, as shown in FIG. 23, the called station sends the flag until it determines the end of the flag from the calling station following to the MCF signal, and when it determines the end of the flag from the calling station, it stops to send the flag and after the elapse of 50 ms, it sends the line proving signal. The control circuit 220 controls such that the called station sends the flag following to the sending of the MCF signal in the step S331 of FIG. 18 and when it determines the end of the flag from the calling station in the step S332, it waits for 50 ms in the step S333, omits the step S334 and moves to the step S341 of FIG. 19 while the calling station omits the step S367 of FIG. 20C and moves from the step S366 to the step S311 of FIG. 16.

In accordance with the present embodiment, the number of times of the sending of the signal for disabling the function of the echo suppressor or echo canceler of the public network (the signal for allowing the full duplex communication) is minimized and the total communication time in the full duplex communication is shortened.

The present invention is not limited to the above embodiments but various modifications thereof may be made.

In accordance with the present invention, in the transmission/reception replacement to send data from the called station to the calling station following to the sending of data from the calling station to the called station, the full duplex communication may be properly conducted. Further, in accordance with the present invention, the number of times of sending the signal to allow the full duplex communication is minimizes and the communication time is shortened.

What is claimed is:

1. A facsimile apparatus comprising:
   a modem that is able to perform communication in a full duplex mode, said modem performing communication in units of data blocks; and
   a protocol signal generation circuit that includes a synchronization signal generation circuit,
   wherein a synchronization signal from the synchronization signal generation circuit is sent between protocol signals generated by said protocol signal generation circuit to maintain the communication in the full duplex mode, a protocol signal comprising a signal other than a data block; and
   wherein the synchronization signal is continuously sent after a protocol signal is sent until an acknowledgment signal is received.

2. A facsimile apparatus comprising:
   a modem that is able to perform communication in a full duplex mode, said modem performing communication in units of data blocks; and
   a protocol signal generation circuit that includes a synchronization signal generation circuit, wherein, in a case where a same protocol signal as that generated by said protocol signal generation circuit and sent previously is possibly resent, a synchronization signal from the synchronization signal generation circuit is sent following the protocol signal to maintain the communication in the full duplex mode, the protocol signal comprising a signal other than a data block; and wherein the synchronization signal is continuously sent after the protocol signal is sent until an acknowledgment signal is received.

3. A facsimile apparatus comprising:

a modem that is able to perform communication in a full duplex mode;

a protocol signal generation circuit that includes a synchronization signal generation circuit; and a high rate signal generation circuit adapted to transmit an image signal of a rate different from a rate of a protocol signal, wherein a synchronization signal is sent from the synchronization signal generation circuit following sending of a high rate signal by said high rate signal generation circuit to maintain the communication in the full duplex mode, and wherein a rate of the synchronization signal is equal to the rate of the protocol signal and is different from the rate of the image signal.

4. A facsimile apparatus comprising:

a modem that is able to perform communication in a full duplex mode;

a protocol signal generation circuit that includes a synchronization signal generation circuit; and a high rate signal generation circuit adapted to transmit an image signal of a rate different from a rate of a protocol signal, wherein a synchronization signal is continuously sent from the synchronization signal generation circuit following sending of a high rate signal by said high rate signal generation circuit to maintain the communication in the full duplex mode, until an acknowledge signal of a predetermined protocol signal is received, and, when the acknowledge signal is received, the sending of the synchronization signal is stopped, and wherein a rate of the synchronization signal is equal to the rate of the protocol signal and is different from the rate of the image signal.

5. A facsimile apparatus comprising:

a modem that is able to perform communication in a full duplex mode;

a protocol signal generation circuit that includes a synchronization signal generation circuit; and a high rate signal generation circuit adapted to transmit an image signal of a rate different from a rate of a protocol signal, wherein a synchronization signal is sent after a start of sending of the protocol signal except during the sending of the protocol signal and except during reception of a high rate signal to maintain the communication in the full duplex mode, and wherein a rate of the synchronization signal is equal to the rate of the protocol signal and is different from the rate of the image signal.

6. A communication apparatus comprising:

a modem that is able to perform communication in a full duplex mode, said modem performing communication in units of data blocks; and a protocol signal generation circuit that includes a synchronization signal generation circuit, wherein a synchronization signal from the synchronization signal generation circuit is sent between protocol signals generated by said protocol signal generation circuit to maintain the communication in the full duplex mode, a protocol signal comprising a signal other than a data block; and wherein the synchronization signal is continuously sent after a protocol signal is sent until an acknowledgment signal is received.

7. A communication apparatus comprising:

a modem that is able to perform communication in a full duplex mode, said modem performing communication in units of data blocks; and a protocol signal generation circuit that includes a synchronization signal generation circuit, wherein, in a case where a same protocol signal as that generated by said protocol signal generation circuit and sent previously is possibly resent, a synchronization signal from the synchronization signal generation circuit is sent following the protocol signal to maintain the communication in the full duplex mode, the protocol signal comprising a signal other than a data block; and wherein the synchronization signal is continuously sent after the protocol signal is sent until an acknowledgment signal is received.

8. A communication apparatus comprising:

a modem that is able to perform communication in a full duplex mode;

a protocol signal generation circuit that includes a synchronization signal generation circuit; and a high rate signal generation circuit adapted to transmit an image signal of a rate different from a rate of a protocol signal, wherein a synchronization signal is sent from the synchronization signal generation circuit following sending of a high rate signal by said high rate signal generation circuit, to maintain the communication in the full duplex mode, and wherein a rate of the synchronization signal is equal to the rate of the protocol signal and is different from the rate of the image signal.

9. A communication apparatus comprising:

a modem that is able to perform communication in a full duplex mode;

a protocol signal generation circuit that includes a synchronization signal generation circuit; and a high rate signal generation circuit adapted to transmit an image signal of a rate different from a rate of a protocol signal, wherein a synchronization signal is continuously sent from the synchronization signal generation circuit following sending of a high rate signal of said high rate signal generation circuit to maintain the communication in the full duplex mode, until an acknowledge signal by a predetermined protocol signal is received, and, when the acknowledge signal is received, the sending of the synchronization signal is stopped, and wherein a rate of the synchronization signal is equal to the rate of the protocol signal and is different from the rate of the image signal.

10. A communication apparatus comprising:

a modem that is able to perform communication in a full duplex mode;

a protocol signal generation circuit that includes a synchronization signal generation circuit; and a high rate signal generation circuit adapted to transmit an image signal of a rate different from a rate of a protocol signal, wherein a synchronization signal is sent after a start of sending of the protocol signal except during the sending of the protocol signal and except during reception of a high rate signal to maintain the communication in the full duplex mode, and wherein a rate of the synchronization signal is equal to the rate of the protocol signal and is different from the rate of the image signal.

11. A data communication apparatus for communicating in a full duplex communication mode, said apparatus comprising:

a sending circuit adapted to send a first signal for allowing the full duplex communication mode;

a protocol signal communication circuit adapted to perform protocol signal communication in the full duplex communication mode after sending of the first signal and without causing a signal interruption longer than a predetermined time interval, to maintain the communication in the full duplex communication mode;

a data communication circuit adapted to perform data communication in a half duplex communication mode after termination of the protocol signal communication;

a transmission/reception replacement circuit adapted to switch transmission/reception of data with a destination station following termination of the data communication, in order to continue the data communication; and a control circuit adapted to cause said sending circuit to send the first signal in a transmission/reception replacement operation by said transmission/reception replacement circuit without disconnection of a line, said control circuit causing said protocol signal communication circuit to perform the protocol signal communication in the full duplex communication mode, and causing said data communication circuit to conduct the data communication in the half duplex communication mode, wherein the first signal sent by said sending circuit disables an echo suppressor of a communication network used by said data communication apparatus.

12. A data communication apparatus according to claim 11, wherein said transmission/reception replacement circuit continues the data communication after the sending of the first signal without causing a signal interruption longer than the predetermined time interval.

13. A data communication apparatus according to claim 11, wherein said data communication circuit sends a predetermined signal following a protocol signal to prevent a signal interruption longer than the predetermined time interval from occurring.

14. A data communication apparatus for communicating in a full duplex communication mode, said apparatus comprising:

a sending circuit adapted to send a first signal for allowing the full duplex communication mode, wherein the first signal sent by said sending circuit disables an echo suppressor of a communication network used by said data communication apparatus;

a protocol signal communication circuit adapted to perform protocol communication in the full duplex communication mode after sending of the first signal and without causing a signal interruption longer than a predetermined time interval, to maintain the communication in the full duplex communication mode;

a data communication circuit adapted to perform data communication in a half duplex communication mode after termination of the protocol signal communication;

a transmission/reception replacement circuit adapted to switch transmission/reception of data with a destination station following termination of the data communication, in order to continue the data communication;

a flag signal communication circuit adapted to communicate a flag signal following a post-protocol signal after transmission of data in a transmission/reception replacement operation to prevent a signal interruption longer than the predetermined time interval from occurring and without disconnection of a line; and a control circuit adapted to cause said protocol signal communication circuit to communicate a protocol signal of the transmission/reception replacement operation without causing a signal interruption longer than the predetermined time interval, to continue the protocol signal communication in the full duplex communication mode, and to cause said data communication circuit to perform the data communication in the half duplex communication mode.

15. A data communication apparatus according to claim 14, wherein the predetermined signal is a dummy signal.

16. A data communication method for performing communication in a full duplex communication mode, said method comprising the steps of:

sending a first signal to allow a full duplex communication mode;

performing protocol signal communication in the full duplex communication mode after said sending of the first signal and without causing a signal interruption longer than a predetermined time interval, to maintain the communication in the full duplex communication mode;

performing data communication in a half duplex mode after termination of the protocol signal communication;

switching transmission/reception of data with a destination station following termination of the data communication, in order to continue the data communication; and sending a signal of a transmission/reception replacement operation without disconnection of a line, performing the protocol signal communication in the full duplex communication mode, and performing the data communication in the half duplex communication mode, wherein the first signal disables an echo suppressor of a communication network used for the communication.

17. A data communication method according to claim 16, wherein a predetermined signal is sent following the protocol signal after sending of the first signal to prevent a signal interruption longer than the predetermined time interval from occurring.

18. A data communication method for performing communication in a full duplex communication mode, said method comprising the steps of:

sending a first signal to allow a full duplex communication mode, wherein the first signal disables an echo suppressor of a communication network used in said data communication method;

performing protocol signal communication in the full duplex communication mode after said sending of the first signal and without causing a signal interruption longer than a predetermined time interval, to maintain the communication in the full duplex communication mode;

performing data communication in a half duplex mode after termination of the protocol signal communication;

switching transmission/reception of data with a destination station following termination of the data communication, in order to continue the data communication;

communicating a flag signal following a post-protocol signal after transmission of data of a transmission/reception replacement operation to prevent a signal interruption longer than the predetermined time interval from occurring and without disconnection of a line; and communicating a protocol signal of the transmission/reception replacement operation, without causing a signal interruption longer than a predetermined time interval, continuing the protocol signal communication in the full duplex communication mode, and performing the data communication at a half duplex communication mode.

19. A data communication method according to claim 18, wherein the predetermined signal is a dummy signal.

* * * * *